US010520872B2

(12) United States Patent
Maeda

(10) Patent No.: US 10,520,872 B2
(45) Date of Patent: Dec. 31, 2019

(54) IMAGE FORMING APPARATUS FOR ADJUSTING IMAGE FORMING POSITION

(71) Applicant: CANON KABUSHIKI KAISHA, Tokyo (JP)

(72) Inventor: Yuuki Maeda, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/402,086

(22) Filed: Jan. 9, 2017

(65) Prior Publication Data
US 2017/0199488 A1 Jul. 13, 2017

(30) Foreign Application Priority Data

Jan. 12, 2016 (JP) ................. 2016-003729

(51) Int. Cl.
| G06F 15/00 | (2006.01) |
| G03G 15/00 | (2006.01) |
| H04N 1/00 | (2006.01) |
| H04N 1/387 | (2006.01) |
| G03G 15/23 | (2006.01) |
| H04N 1/48 | (2006.01) |
| H04N 1/50 | (2006.01) |

(52) U.S. Cl.
CPC ....... *G03G 15/5062* (2013.01); *G03G 15/235* (2013.01); *H04N 1/00039* (2013.01); *H04N 1/00761* (2013.01); *H04N 1/00771* (2013.01); *H04N 1/00803* (2013.01); *H04N 1/3872* (2013.01); *H04N 1/48* (2013.01); *H04N 1/506* (2013.01); *G03G 15/55* (2013.01); *H04N 2201/0081* (2013.01); *H04N 2201/0082* (2013.01); *H04N 2201/04717* (2013.01)

(58) Field of Classification Search
CPC .......... G03G 15/5062; H04N 1/00039; H04N 1/00761; H04N 1/00771; H04N 1/00803; H04N 1/3872
USPC ....................................... 358/1.14
See application file for complete search history.

(56) References Cited

U.S. PATENT DOCUMENTS

| 7,760,370 | B2 | 7/2010 | Oki | |
| 2015/0070732 | A1* | 3/2015 | Kishi | G03G 15/5062 358/3.27 |

FOREIGN PATENT DOCUMENTS

| JP | 2006-060713 A | 3/2006 |
| JP | 2012-008477 A | 1/2012 |
| JP | 2014-022919 A | 2/2014 |

(Continued)

*Primary Examiner* — Mark R Milia
(74) *Attorney, Agent, or Firm* — Canon U.S.A., Inc. IP Division

(57) ABSTRACT

An image forming apparatus includes an image forming unit, a display, a reading unit configured to read a reference image formed on a test sheet by the image forming unit, wherein the reference image includes a mark corresponding to a reading order, a controller configured to control the image forming unit to form the reference image, cause the reading unit to execute a first reading operation, determine whether first read data is obtained, inform of a reading error if the first read data is not obtained in the first reading operation, cause the reading unit to execute a second reading operation, determine whether second read data is obtained, and inform of a reading error if the second read data is not obtained in the second reading operation, and an adjustment unit configured to adjust image forming positions based on the first read data and the second read data.

18 Claims, 23 Drawing Sheets

(56) References Cited

FOREIGN PATENT DOCUMENTS

| JP | 2014-023088 A | 2/2014 |
| JP | 2014-165538 A | 9/2014 |
| JP | 2015-114611 A | 6/2015 |
| JP | 2016-039522 A | 3/2016 |

* cited by examiner

FIG.5A

| SHEET NAME | SHEET LENGTH IN SUB SCANNING DIRECTION (mm) | SHEET LENGTH IN MAIN SCANNING DIRECTION (mm) | BASIS WEIGHT (g/m²) | SURFACE PROPERTY | COLOR | PRE-PRINT PAPER | PRINT POSITION DEVIATION AMOUNT (FRONT SURFACE) | PRINT POSITION DEVIATION AMOUNT (REAR SURFACE) |
|---|---|---|---|---|---|---|---|---|
| ABC PAPER COMPANY RECYCLE 1 | 210 | 297 | 75 | PLAIN PAPER | WHITE | NO | RIGHT ANGLE CORRECTION AMOUNT: 0.23 mm<br>TRAPEZOID ANGLE CORRECTION AMOUNT: 0.71 mm<br>LEAD POSITION: 0.3 mm<br>SIDE POSITION: -0.1 mm<br>MAIN-SCANNING MAGNIFICATION: -0.02%<br>SUB-SCANNING MAGNIFICATION: +0.01% | RIGHT ANGLE CORRECTION AMOUNT: 0.27 mm<br>TRAPEZOID ANGLE CORRECTION AMOUNT: 0.55 mm<br>LEAD POSITION: 0.2 mm<br>SIDE POSITION: 0.1 mm<br>MAIN-SCANNING MAGNIFICATION: +0.02%<br>SUB-SCANNING MAGNIFICATION: -0.03% |
| ABC PAPER COMPANY RECYCLE 2 | 297 | 420 | 75 | PLAIN PAPER | WHITE | NO | RIGHT ANGLE CORRECTION AMOUNT: 0.00 mm<br>TRAPEZOID ANGLE CORRECTION AMOUNT: 0.09 mm<br>LEAD POSITION: 0.0 mm<br>SIDE POSITION: 0.0 mm<br>MAIN-SCANNING MAGNIFICATION: -0.00%<br>SUB-SCANNING MAGNIFICATION: -0.00% | RIGHT ANGLE CORRECTION AMOUNT: 0.00 mm<br>TRAPEZOID ANGLE CORRECTION AMOUNT: 0.09 mm<br>LEAD POSITION: 0.0 mm<br>SIDE POSITION: 0.0 mm<br>MAIN-SCANNING MAGNIFICATION: +0.00%<br>SUB-SCANNING MAGNIFICATION: +0.00% |
| DEF PAPER COMPANY EMBOSSED PAPER A-1 | 216 | 279 | 150 | EMBOSSED | WHITE | NO | RIGHT ANGLE CORRECTION AMOUNT: -0.48 mm<br>TRAPEZOID ANGLE CORRECTION AMOUNT: 0.41 mm<br>LEAD POSITION: 0.5 mm<br>SIDE POSITION: -0.5 mm<br>MAIN-SCANNING MAGNIFICATION: -0.02%<br>SUB-SCANNING MAGNIFICATION: -0.02% | RIGHT ANGLE CORRECTION AMOUNT: 0.08 mm<br>TRAPEZOID ANGLE CORRECTION AMOUNT: 0.29 mm<br>LEAD POSITION: -0.3 mm<br>SIDE POSITION: 0.5 mm<br>MAIN-SCANNING MAGNIFICATION: +0.01%<br>SUB-SCANNING MAGNIFICATION: -0.03% |
| DEF PAPER COMPANY COATED PAPER P-1 | 279 | 432 | 128 | DOUBLE-SIDE COATED | WHITE | NO | RIGHT ANGLE CORRECTION AMOUNT: 0.11 mm<br>TRAPEZOID ANGLE CORRECTION AMOUNT: -0.21 mm<br>LEAD POSITION: 0.4 mm<br>SIDE POSITION: -0.2 mm<br>MAIN-SCANNING MAGNIFICATION: -0.12%<br>SUB-SCANNING MAGNIFICATION: +0.08% | RIGHT ANGLE CORRECTION AMOUNT: 0.41 mm<br>TRAPEZOID ANGLE CORRECTION AMOUNT: -0.31 mm<br>LEAD POSITION: -0.2 mm<br>SIDE POSITION: 0.6 mm<br>MAIN-SCANNING MAGNIFICATION: -0.02%<br>SUB-SCANNING MAGNIFICATION: -0.01% |

FIG. 5B

| SHEET NAME | SHEET LENGTH IN SUB SCANNING DIRECTION (mm) | SHEET LENGTH IN MAIN SCANNING DIRECTION (mm) | BASIS WEIGHT (g/m²) | SURFACE PROPERTY | COLOR | PRE-PRINT PAPER | PRINT POSITION DEVIATION AMOUNT (FRONT SURFACE) | PRINT POSITION DEVIATION AMOUNT (REAR SURFACE) |
|---|---|---|---|---|---|---|---|---|
| XYZ PAPER COMPANY COLOR 81 | 210 | 297 | 75 | PLAIN PAPER | ORANGE | NO | RIGHT ANGLE CORRECTION AMOUNT: 0.00 mm<br>TRAPEZOID ANGLE CORRECTION AMOUNT: 0.00 mm<br>LEAD POSITION: 0.0 mm<br>SIDE POSITION: 0.0 mm<br>MAIN-SCANNING MAGNIFICATION: +0.00%<br>SUB-SCANNING MAGNIFICATION: +0.00% | RIGHT ANGLE CORRECTION AMOUNT: 0.00 mm<br>TRAPEZOID ANGLE CORRECTION AMOUNT: 0.00 mm<br>LEAD POSITION: 0.0 mm<br>SIDE POSITION: 0.0 mm<br>MAIN-SCANNING MAGNIFICATION: +0.00%<br>SUB-SCANNING MAGNIFICATION: +0.00% |
| XYZ PAPER COMPANY COLOR 82 | 210 | 297 | 75 | PLAIN PAPER | PINK | NO | RIGHT ANGLE CORRECTION AMOUNT: 0.00 mm<br>TRAPEZOID ANGLE CORRECTION AMOUNT: 0.00 mm<br>LEAD POSITION: 0.0 mm<br>SIDE POSITION: 0.0 mm<br>MAIN-SCANNING MAGNIFICATION: +0.00%<br>SUB-SCANNING MAGNIFICATION: +0.00% | RIGHT ANGLE CORRECTION AMOUNT: 0.00 mm<br>TRAPEZOID ANGLE CORRECTION AMOUNT: 0.00 mm<br>LEAD POSITION: 0.0 mm<br>SIDE POSITION: 0.0 mm<br>MAIN-SCANNING MAGNIFICATION: +0.00%<br>SUB-SCANNING MAGNIFICATION: +0.00% |

FIG.6A

EDIT OF SHEET MANAGEMENT TABLE  600

| SHEET NAME | SHEET LENGTH IN SUB SCANNING DIRECTION (mm) | SHEET LENGTH IN MAIN SCANNING DIRECTION (mm) | BASIS WEIGHT (g/m$^2$) | SURFACE PROPERTY | COLOR |
|---|---|---|---|---|---|
| ABC PAPER COMPANY RECYCLE 1 | 210 | 297 | 75 | PLAIN PAPER | WHITE |
| ABC PAPER COMPANY RECYCLE 2 | 297 | 420 | 75 | PLAIN PAPER | WHITE |
| DEF PAPER COMPANY EMBOSSED PAPER A-1 | 216 | 279 | 150 | EMBOSSED | WHITE |
| DEF PAPER COMPANY COATED PAPER P-1 | 279 | 432 | 128 | DOUBLE-SIDE COATED | WHITE |
| XYZ PAPER COMPANY COLOR 81 | 210 | 297 | 75 | PLAIN PAPER | ORANGE |
| XYZ PAPER COMPANY COLOR 82 | 210 | 297 | 75 | PLAIN PAPER | PINK |

601 NEWLY ADD  602 EDIT  DELETE  603 ADJUST PRINT POSITION

FIG.6B

EDIT OF SHEET ATTRIBUTE  610

| | |
|---|---|
| SHEET NAME | XYZ PAPER COMPANY COLOR 81 |
| SHEET LENGTH IN SUB SCANNING DIRECTION (mm) | 210 |
| SHEET LENGTH IN MAIN SCANNING DIRECTION (mm) | 297 |
| BASIS WEIGHT (g/m$^2$) | 75 |
| SURFACE PROPERTY | PLAIN PAPER ▽ |
| COLOR | WHITE ▽ |
| PRE-PRINT PAPER | ☑ |

END EDIT —611  CANCEL

FIG.9

| | MEASURED VALUE | IDEAL VALUE | PRINT POSITION DEVIATION AMOUNT |
|---|---|---|---|
| LEAD POSITION (FRONT SURFACE) | $\frac{(C)+(E)}{2}$ | 1 cm | MEASURED VALUE - IDEAL VALUE |
| SIDE POSITION (FRONT SURFACE) | $\frac{(F)+(J)}{2}$ | 1 cm | MEASURED VALUE - IDEAL VALUE |
| MAIN-SCANNING MAGNIFICATION (FRONT SURFACE) | $\frac{((B)-(D)-(F))+((B)-(H)-(J))}{2}$ | (SHEET LENGTH IN MAIN SCANNING DIRECTION) - 2cm | (MEASURED VALUE - IDEAL VALUE) / IDEAL VALUE |
| SUB-SCANNING MAGNIFICATION (FRONT SURFACE) | $\frac{((A)-(C)-(G))+((A)-(E)-(I))}{2}$ | (SHEET LENGTH IN SUB SCANNING DIRECTION) - 2cm | (MEASURED VALUE - IDEAL VALUE) / IDEAL VALUE |
| RIGHT ANGLE CORRECTION AMOUNT (FRONT SURFACE) | $\frac{(S)+(T)}{2}$ | 0 cm | MEASURED VALUE |
| TRAPEZOID ANGLE CORRECTION AMOUNT (FRONT SURFACE) | $((B)-(D)-(F))-((B)-(H)-(J))$ | 0 cm | MEASURED VALUE |
| LEAD POSITION (REAR SURFACE) | $\frac{(K)+(M)}{2}$ | 1 cm | MEASURED VALUE - IDEAL VALUE |
| SIDE POSITION (REAR SURFACE) | $\frac{(N)+(R)}{2}$ | 1 cm | MEASURED VALUE - IDEAL VALUE |
| MAIN-SCANNING MAGNIFICATION (REAR SURFACE) | $\frac{((B)-(L)-(N))+((B)-(P)-(R))}{2}$ | (SHEET LENGTH IN MAIN SCANNING DIRECTION) - 2cm | (MEASURED VALUE - IDEAL VALUE) / IDEAL VALUE |
| SUB-SCANNING MAGNIFICATION (REAR SURFACE) | $\frac{((A)-(K)-(O))+((A)-(M)-(Q))}{2}$ | (SHEET LENGTH IN SUB SCANNING DIRECTION) - 2cm | (MEASURED VALUE - IDEAL VALUE) / IDEAL VALUE |
| RIGHT ANGLE CORRECTION AMOUNT (REAR SURFACE) | $\frac{(U)+(V)}{2}$ | 0 cm | MEASURED VALUE |
| TRAPEZOID ANGLE CORRECTION AMOUNT (REAR SURFACE) | $((B)-(L)-(N))-((B)-(P)-(R))$ | 0 cm | MEASURED VALUE |

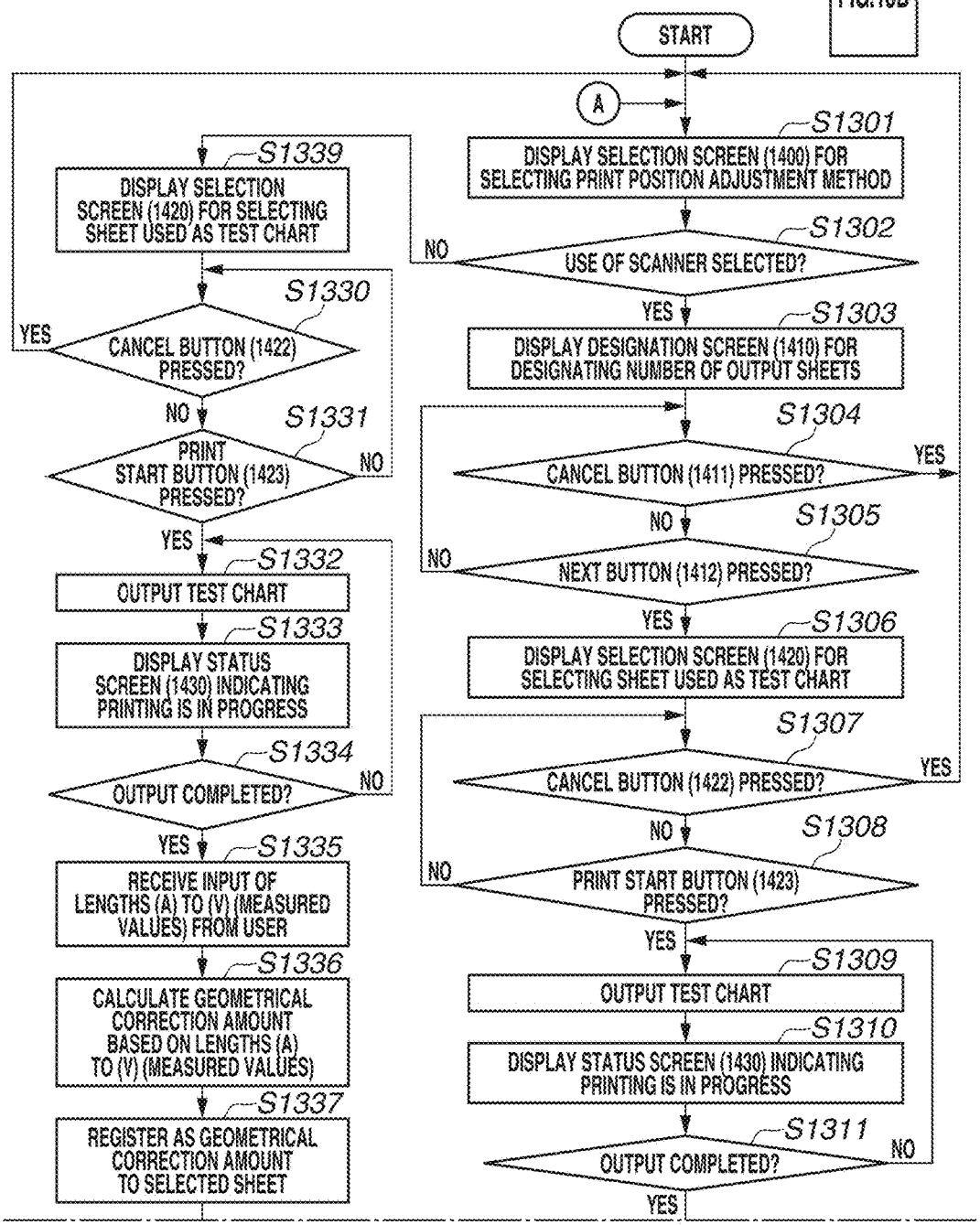

FIG.14A

<PRINT POSITION ADJUSTMENT: METHOD SELECTION> 1400

1401 NOT USE SCANNER

1402 USE SCANNER

CLOSE

FIG.14B

<PRINT POSITION ADJUSTMENT: NUMBER OF OUTPUT SHEETS OF TEST CHART> 1410

DESIGNATE THE NUMBER OF OUTPUT SHEETS OF TEST CHART FOR ADJUSTMENT.

1
(1 - 10)
−   +

(TEST CHART ARE OUTPUT AND THEN READ BY SCANNER. ONE SHEET IS READ FOUR TIMES BY CHANGING POSITION.)

1411 — CANCEL    1412 — NEXT

FIG.14C

<PRINT POSITION ADJUSTMENT: SHEET SELECTION> 1420

SELECT SHEET USED AS TEST CHART.

| SHEET SIZE | NAME | |
|---|---|---|
| ☐ A4 | ABC PAPER COMPANY RECYCLE 1 | 1421 |
| ☐ 270 × 432 mm | DEF PAPER COMPANY COATED PAPER P-1 | |
| ☐ A4 | XYZ PAPER COMPANY COLOR 81 | |
| ☐ A3 | ABC PAPER COMPANY RECYCLE 2 | |

1422 — CANCEL    1423 — START PRINT

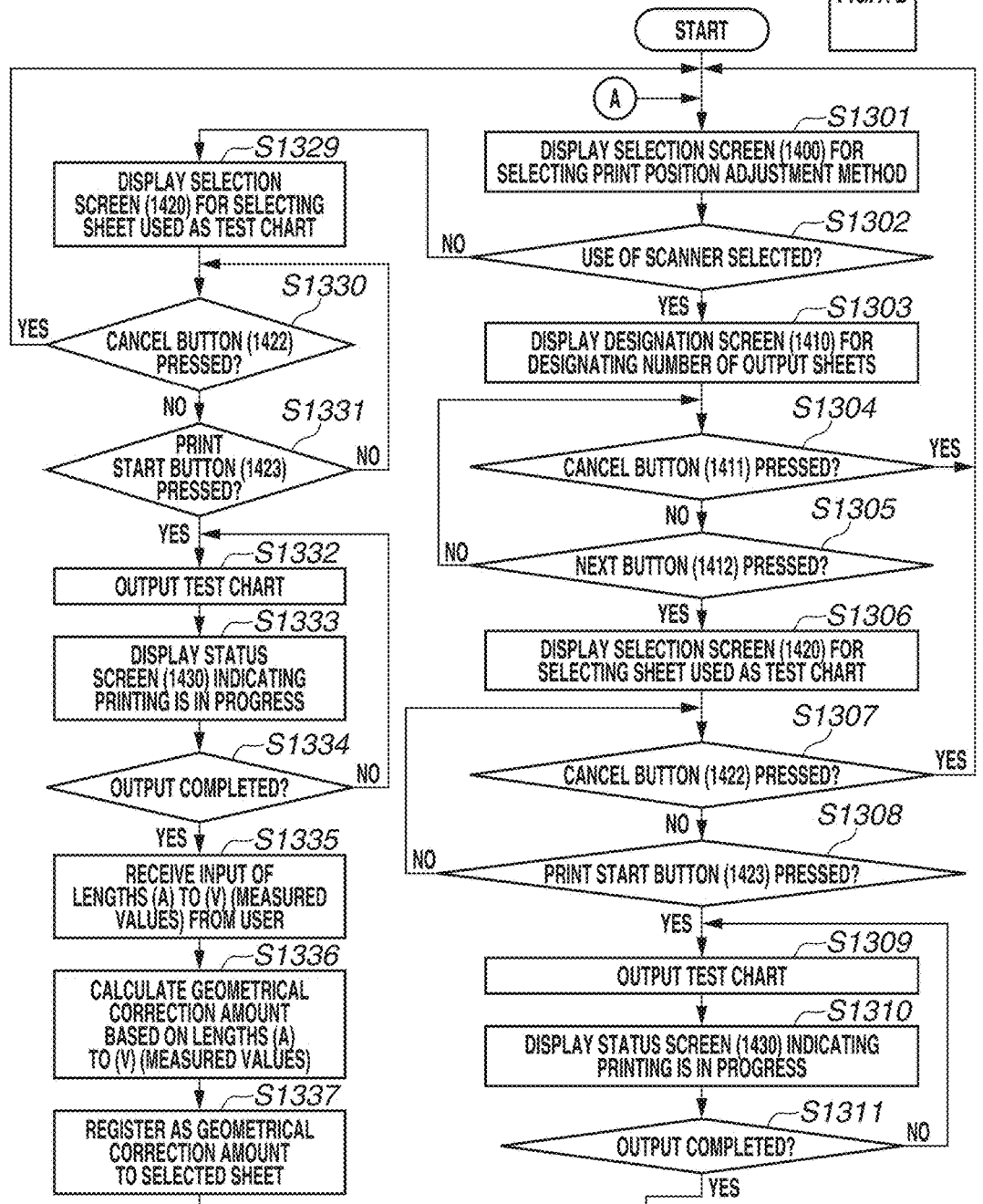

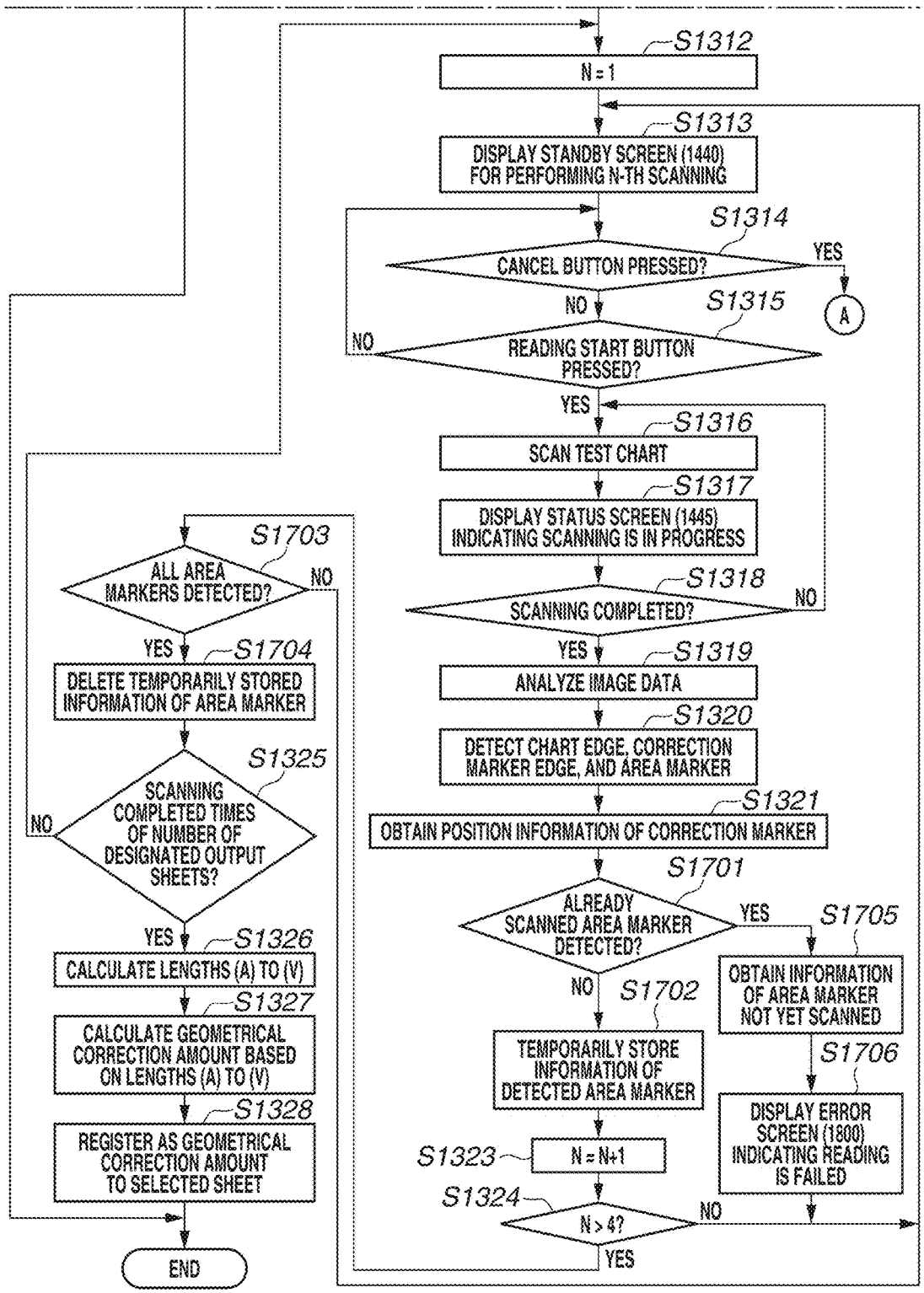

<PRINT POSITION ADJUSTMENT>

READING IS FAILED.

PLACE TEST CHART AND ALIGNMENT SHEET FOLLOWING BELOW PLACEMENT WAY.

OK

IMAGE FORMING APPARATUS FOR ADJUSTING IMAGE FORMING POSITION

BACKGROUND OF THE INVENTION

Field of the Invention

The present invention relates to an image forming apparatus for adjusting an image forming position based on read data of a test chart.

Description of the Related Art

When an image is printed on a sheet, an image forming apparatus first forms the image on the sheet and fixes the image by heat in a fixing unit. At that time, the sheet shrinks by heat from the fixing unit. Thus, print positions may respectively deviate in a main scanning direction and a sub scanning direction of the sheet.

An image forming apparatus described in U.S. Pat. No. 7,760,370 output an adjustment pattern in which reference images for alignment are formed at four corners on a sheet to correct an image forming position of the sheet. The adjustment patterns are printed on both of a first surface and a second surface different from the first surface of the sheet.

A user places the sheet output from the image forming apparatus on a scanner. The user causes the scanner to read the adjustment pattern on the first surface of the sheet. Subsequently, the user turns the sheet on which the adjustment pattern is formed on the scanner and causes the scanner to read the adjustment pattern on the second surface of the sheet. The image forming apparatus adjusts the image forming position of the first surface and the image forming position of the second surface using the read data of the adjustment pattern printed on the first surface of the sheet and the read data of the adjustment pattern printed on the second surface of the sheet.

SUMMARY OF THE INVENTION

An image forming apparatus according to one aspect of the present invention includes An image forming apparatus includes an image forming unit configured to form an image on a sheet, a display, a reading unit configured to read a reference image formed on a test sheet by the image forming unit, wherein the reference image includes a mark corresponding to a reading order of the test sheet, a controller configured to control the image forming unit to form a first reference image on a first surface of the test sheet and a second reference image on a second surface different from the first surface of the test sheet, display a first guidance for a reading operation on the first surface of the test sheet by the reading unit on a display at a first timing, cause the reading unit to execute a first reading operation to obtain first read data regarding the first reference image of the test sheet, analyze read data obtained in the first reading operation, determine whether the first read data is obtained based on the analysis result, inform of a reading error if the first read data is not obtained in the first reading operation, display a second guidance for a reading operation on the second surface different from the first surface of the test sheet by the reading unit on the display at a second timing subsequent to the first timing, cause the reading unit to execute a second reading operation to obtain second read data regarding the second reference image of the test sheet, analyze read data obtained in the second reading operation, determine whether the second read data is obtained based on the analysis result, and inform of a reading error if the second read data is not obtained in the second reading operation, and an adjustment unit configured to adjust a first image forming position of the image formed by the image forming unit on the first surface of the sheet and a second image forming position of the image formed by the image forming unit on the second surface different from the first surface of the sheet based on the first read data and the second read data.

Further features of the present invention will become apparent from the following description of exemplary embodiments with reference to the attached drawings.

BRIEF DESCRIPTION OF THE DRAWINGS

FIG. 5 (including 5A and 5B) is an example of a table.

FIGS. 6A and 6B illustrate configurations of screens.

FIG. 9 is an example of a table.

FIGS. 14A to 14F illustrate configurations of screens.

FIG. 17 (including FIGS. 17A and 17B) is a flowchart illustrating an example of control according to a modification.

DESCRIPTION OF THE EMBODIMENTS

The present invention is described in detail below with reference to the attached drawings.

A configuration of a print system is described with reference to a block diagram in FIG. 1.

An image forming apparatus prints a plurality of first images indicating print positions and a second image indicating a reading order of the plurality of the first images on a sheet. The image forming apparatus then obtains the print positions of the plurality of the first images printed on the sheet based on image data generated by reading the plurality of the first images in the reading order indicated by the second image. Subsequently, the image forming apparatus adjusts a position at which an image is printed on the sheet based on the obtained print positions of the plurality of the first images. The processing is described in detail below.

The print system includes an image forming apparatus 100 and a personal computer (PC) 101 as an example of an external apparatus.

The image forming apparatus 100 has a copy function of generating image data by reading a document and printing an image on a sheet based on the generated image data. The image forming apparatus 100 also has a PC print function of receiving print data from the external apparatus, such as the PC 101, and printing a character and an image on a sheet based on the print data. Printing by the print function may be color printing and monochromatic printing.

A controller unit (control unit) 110 of the image forming apparatus 100 is connected to the PC 101 via a local area network (LAN) 105. The controller unit 110 and the PC 101 is not limited to a configuration connected via the LAN 105. The controller unit 110 and the PC 101 may have a configuration connected via a wide area network (WAN), such the Internet and a dedicated printer cable instead of the LAN 105. FIG. 1 illustrates the configuration in which a single PC 101 is connected to the image forming apparatus 100 via the LAN 105, however, the configuration is not limited to this one. A plurality of the PCs 101 may be connected to the image forming apparatus 100 via the LAN 105.

The PC 101 generates image data using, for example, application software and transmits the generated image data to the image forming apparatus 100. The PC 101 generates page description language (PDL) data using, for example, a printer driver. The controller unit 110 rasterizes the PDL data transmitted from the PC 101 via the LAN 105 and generates bitmap data.

Figure 1:
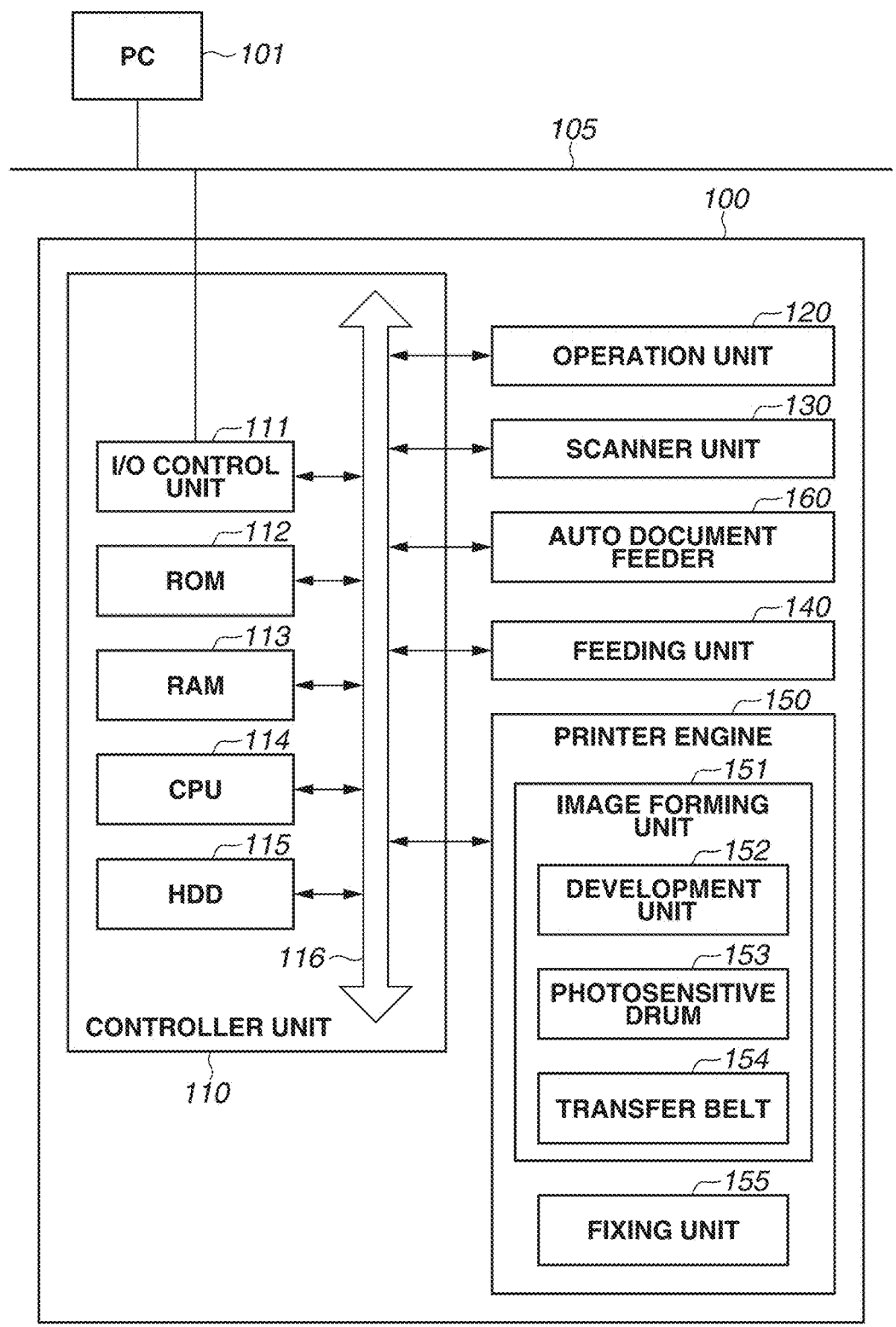
FIG. 1 is a block diagram illustrating a configuration of a print system.

A configuration of the image forming apparatus 100 is described using the block diagram in FIG. 1. The image forming apparatus 100 includes the controller unit 110, a printer engine 150 as an image output device, and a scanner unit 130 as an image input device. The image forming apparatus 100 further includes an auto document feeder (ADF) 160 for feeding a document from a document tray, a feeding unit 140 for feeding a sheet from a sheet storage unit, and an operation unit 120. These units are electrically connected to each other and transmit and receive control commands and data to and from each other.

The controller unit 110 comprehensively controls operations of the image forming apparatus 100 and also controls input and output of image information and device information. The controller unit 110 includes a central processing unit (CPU) 114, an input-output (I/O) control unit 111, a read only memory (ROM) 112, a random access memory (RAM) 113, and a hard disk drive (HDD) 115. Each module is connected to each other via a system bus 116.

The CPU 114 comprehensively controls the image forming apparatus 100 based on a control program and the like stored in the ROM 112. The CPU 114 reads the control program stored in the ROM 112 and executes various control processing, for example, control of reading by the scanner unit 130, control of printing by the printer engine 150, and control of firmware update.

The I/O control unit 111 is a module for controlling communication with an external network.

The RAM 113 is a readable and writable memory. The RAM 113 also serves as a system work memory for the CPU 114 to operate. The RAM 113 stores image data input from the scanner unit 130, the PC 101, and the like, various programs, setting information, and the like.

The ROM 112 is a read-only memory. The ROM 112 also serves as a boot ROM. The ROM 112 stores a boot program of the system in advance.

The HDD 115 mainly stores information (system software) necessary for starting and operating the computer and image data.

When the controller unit 110 includes a non-volatile RAM (NVRAM), the system software, the image data, setting information received via the operation unit 120, which is described below, and the like may be stored in the NVRAM.

The RAM 113 or the HDD 115 stores a sheet management table 500 for managing attribute information of a sheet used for printing in the image forming apparatus 100 in a list form. The sheet management table 500 is described in detail below with reference to FIG. 5 (including FIGS. 5A and 5B).

The ROM 112 or the HDD 115 stores various control programs necessary for executing various processing of a flowchart described below and the like executed by the CPU 114. The ROM 112 or the HDD 115 further stores a display control program for displaying various user interface screens (hereinbelow, the UI screen) on a display panel of the operation unit 120. The CPU 114 reads the program stored in the ROM 112 or the HDD 115, develops the program in the RAM 113, and thus executes various operations.

The feeding unit 140 is a unit for feeding a sheet from a plurality of sheet storage units (for example, a feeding cassette, a feeding deck, and a manual feed tray). Each sheet storage unit can store a plurality of types of sheets and a plurality of sheets. An uppermost sheet in the sheets stored in the sheet storage unit is separated one by one and conveyed to an image forming unit 151. The image forming unit 151 prints an image on the sheet fed from the sheet storage unit based on image data input from the scanner unit 130, the PC 101, and the like.

The operation unit 120 is an example of a user interface unit. The operation unit 120 includes the display panel and a key input unit. The operation unit 120 has a function of receiving various settings from a user via the display panel and the key input unit. The operation unit 120 further has a function of providing information to the user via the display panel.

The display panel is a liquid crystal display (LCD) panel and displays an operation screen and a state of the image forming apparatus 100. The key input unit includes physical keys (also referred to as hard keys), for example, a start key used for instructing start of execution of scanning, copying, and the like and a stop key used for instructing stop of operations, such as scanning and copying being performed.

Figure 2:
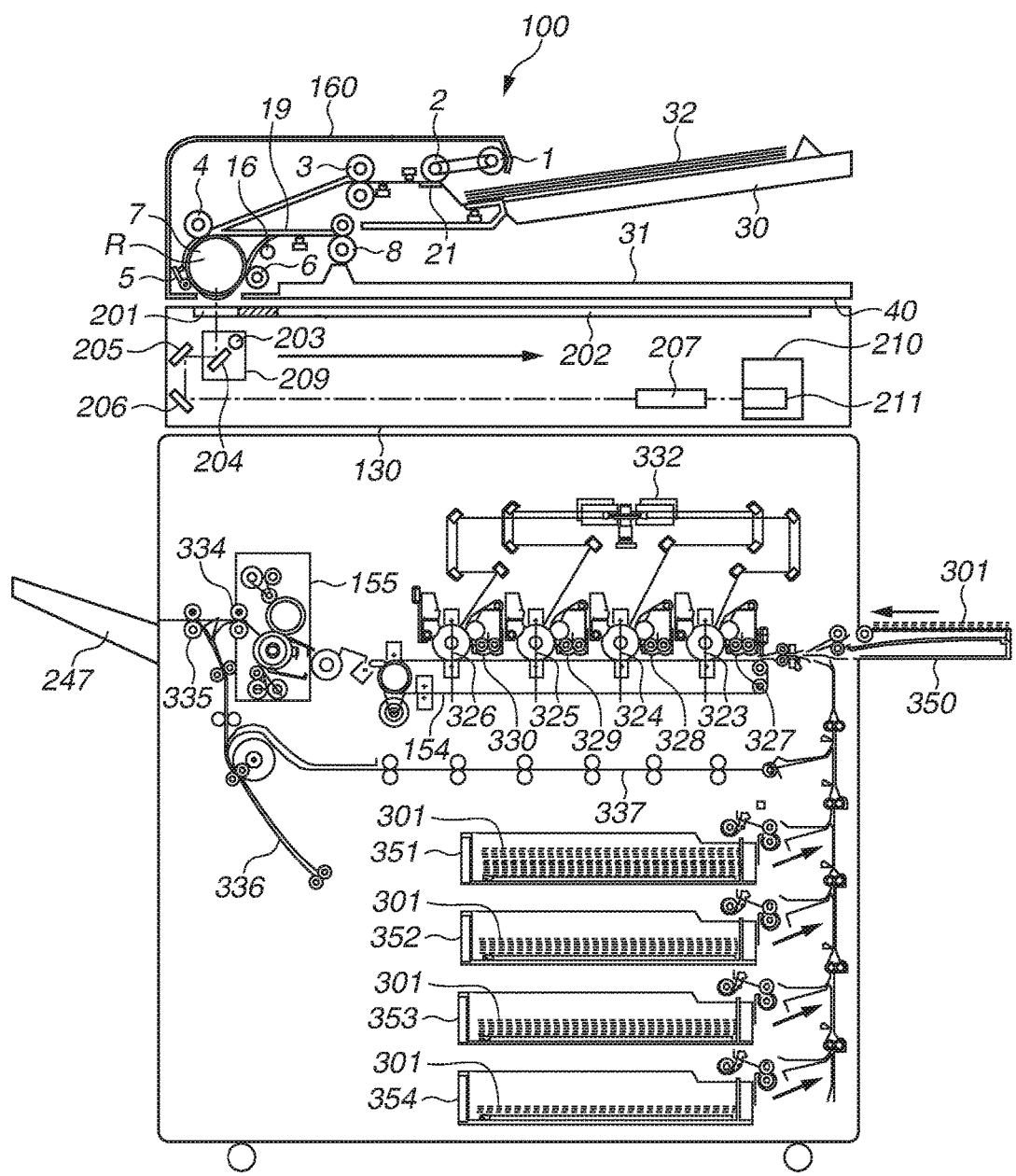
FIG. 2 is a cross-sectional view illustrating a configuration of an image forming apparatus.

The scanner unit 130 scans an image on a document using an optical system and generates image data. An operation of the scanner unit 130 is described below with reference to a cross-sectional view in FIG. 2.

The printer engine 150 includes the image forming unit 151 and a fixing unit 155. The image forming unit 151 includes a development unit 152, a photosensitive drum 153, and a transfer belt 154. An operation of the printer engine 150 is described below with reference to the cross-sectional view in FIG. 2. The color image forming apparatus 100 includes four photosensitive drums 153 and four development units 152 of cyan, yellow, magenta, and black colors.

The feeding unit 140 includes the cassette and the manual feed tray as the sheet storage units (also referred to as sheet feeding cassettes). The cassette can store a plurality of the sheets 301 (for example, 600 sheets). On the other hand, the manual feed tray can store a plurality of the sheets 301 (for example, 100 sheets).

The auto document feeder 160 includes the document tray for stacking a document. The auto document feeder 160 feeds the document placed on the document tray. The scanner unit 130 reads an image on the fed document at a fixed position of the optical system.

The auto document feeder 160 includes a document tray 30 for stacking a document bundle including one or more sheets of a document 32, a separation pad 21 for regulating the document bundle so as not to advance from the document tray 30 to downstream before conveyance of the document 32 is started, and a feeding roller 1.

The feeding roller 1 falls onto a document surface of the document bundle stacked on the document tray and rotates. Accordingly, the document 32 on the uppermost surface of the document bundle is fed. A plurality of sheets of the document 32 fed by the feeding roller 1 is separated one by one and fed by an action of a separation roller 2 and the separation pad 21. The separation is realized by a known retard separation technique.

The document 32 separated by the separation roller 2 and the separation pad 21 is conveyed by a pair of conveying rollers 3 to a registration roller 4. The conveyed document 32 abuts on the registration roller 4. Accordingly, skew of the document 32 in the conveyance is resolved. A feeding path is disposed on a downstream side of the registration roller 4. The feeding path is a path for conveying the document 32 passed through the registration roller 4 to a direction of a document feeding-reading glass 201. The document 32 conveyed to the feeding path is conveyed by a large roller 7 being in contact with the document feeding-reading glass 201 and a feeding roller 5 so as to pass through the document feeding-reading glass 201.

The scanner unit 130 reads an image on the document 32 passing through the document feeding-reading glass 201 by the optical system. The optical system includes an optical scanner unit 209 including an optical lamp 203 and a mirror 204, mirrors 205 and 206, a lens 207, and a charge coupled device (CCD) sensor unit 210. The CCD sensor unit 210 includes a CCD 211 (three line sensor unit) for reading a color image (read, green, and blue (RGB)). Image information read by the optical system is photoelectrically converted and input as image data to the controller unit 110. The image data input from the CCD 211 to the controller unit 110 is RGB data. The optical system included in the scanner unit 130 is described as a reduction optical system in which reflected light from the document 32 is formed as an image on the CCD sensor, however, the optical system is not limited to the above-described one. The optical system included in the scanner unit 130 may be an equal-magnification optical system in which the reflected light from the document 32 is formed as an image on a contact image sensor (CIS).

After the image on the document 32 is read by the optical system, the document 32 fed by the large roller 7 passes through a conveyance roller 6 and moves between a roller 16 and a discharge diverter. The document 32 is then discharged to a document discharge tray 31 via the discharge diverter and a discharge roller 8.

The scanner unit 130 can read an image on the document 32 (a rear surface) by reversing the document 32. More specifically, the discharge roller 8 is reversely rotated in a state that the discharge roller 8 pinches the document 32 and the discharge diverter is switched, so that the document 32 is moved to a reversing path 19. Further, the document 32 is attached to the registration roller 4 from the reversing path 19 and the skew of the document 32 in the conveyance is resolved again. Then, the document 32 is moved again by the feeding roller 5 and the large roller 7 to the document feeding-reading glass 201. The scanner unit 130 reads an image on the document 32 (the rear surface) passing through the document feeding-reading glass 201 by the optical system.

Figure 3:
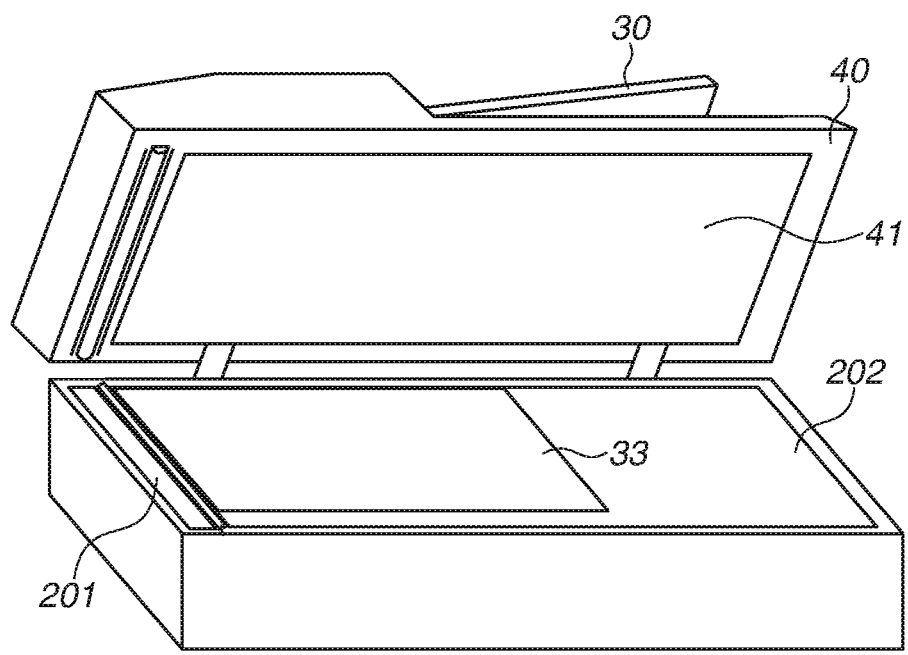
FIG. 3 is an external appearance of a document positioning glass plate.

Reading of an image on a document placed on a document positioning glass plate 202 is described with reference to an external appearance of the document positioning glass plate 202 illustrated in FIG. 3 and a top view of the document positioning glass plate 202 illustrated in FIG. 4. The optical scanner unit 209 is a unit for detecting a sheet length of the document in a main scanning direction. Reflection type sensors 220 and 221 illustrated in FIG. 4 are sensors for detecting a sheet length of the document in a sub scanning direction.

The user opens a pressing plate 40 capable of opening and closing for placing a document 33 on the document positioning glass plate 202. At that time, the CPU 114 detects that the pressing plate 40 is opened. Subsequently, the user places the document 33 on the document positioning glass plate 202 with a read surface of the document 33 down (referred to as facedown) and aligns with a reference position (upper left) of the document positioning glass plate 202. Then, the user closes the pressing plate 40 to fix the document 33. At that time, the CPU 114 moves the optical scanner unit 209 in the sub scanning direction from a left edge toward a right edge of a lower surface of the document positioning glass plate 202 to a position at which the document 33 placed on the document positioning glass plate 202 can be read. Image information read by the optical scanner unit 209 is photoelectrically converted and input as image data to the controller unit 110.

Figure 4:
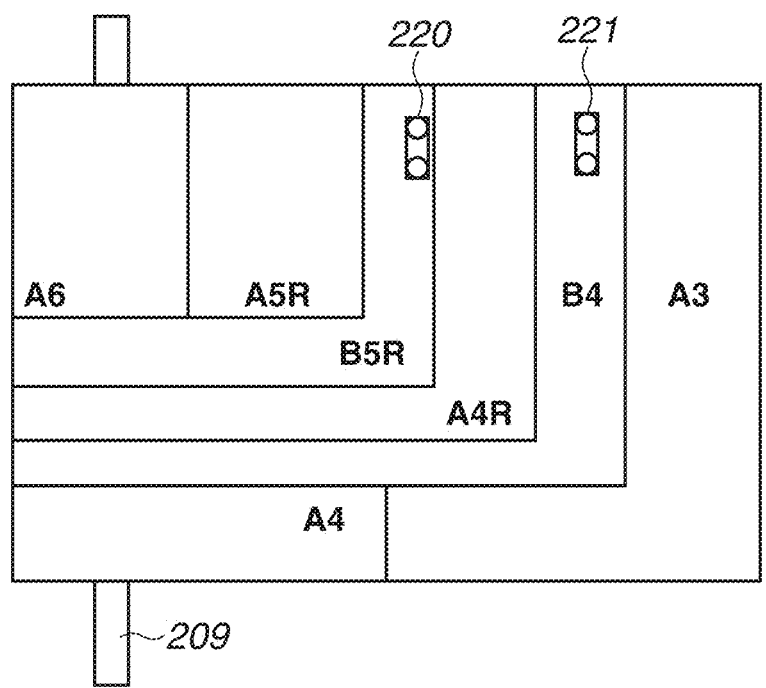
FIG. 4 is a top view of the document positioning glass plate.

The sheet length in the sub scanning direction of the document 33 placed on the document positioning glass plate 202 is detected by a plurality of the reflection type sensors 220 and 221 arranged as illustrated in FIG. 4. The reflection type sensors 220 and 221 emit infrared light from light-emitting units thereof from below the document positioning glass plate 202, receive reflected light from the document by light-receiving units thereof, and thus detects an approximate length of the document in the sub scanning direction. In the middle of an operation for closing the pressing plate 40, the optical lamp 203 is turned on to illuminate the document 33 with light. A white plate 41 is attached to a rear side of the pressing plate 40. The CCD 211 reads an image on a certain line of the document 33 in the main scanning direction. The CPU 114 detects a portion at which the light from the optical lamp 203 is blocked and reflected from the document 33 and a portion at which the light from the optical lamp 203 is not blocked and returned since there is no the document 33. The CPU 114 detects an edge portion of the document 33 based on the detected results.

The image forming unit 151 performs an operation (print operation) for outputting an image on the sheet 301 based on the image data transferred to the printer engine 150.

The image data transferred to the printer engine 150 is converted into a laser beam corresponding to the image data by a laser unit 332. The laser beam is irradiated on the photosensitive drums 153 (323 to 326), and electrostatic latent images corresponding to the image data are formed on the photosensitive drums 153 (323 to 326). The development units 152 (327 to 330) apply toner (developer) to portions of the latent images on the photosensitive drums 153 (323 to 326).

The image forming unit 151 transfers the toner attached to the photosensitive drums 153 (323 to 326) to the sheet 301 fed from any of the cassettes (351 to 354) and a manual feed tray 350. The sheet 301 on which the toner is transferred via the transfer belt 154 is conveyed to the fixing unit 155. The fixing unit 155 fixes the toner to the sheet 301 by heat and pressure. When one-sided printing is executed, the sheet 301 passed through the fixing unit 155 is discharged to a discharge tray 247 (a discharge unit) included in the image forming apparatus 100 by conveyance rollers 334 and 335. Whereas, when double-sided printing is executed, the sheet 301 passed through the fixing unit 155 is moved to a reversing path 336 by the conveyance roller 334. Subsequently, the sheet 301 switched back via the reversing path 336 is moved to a double-sided path 337. The image forming unit 151 transfers the toner attached to the photosensitive drums 153 (323 to 326) to the sheet 301 (rear surface) passed through the double-sided path 337. Then, the sheet 301 on which the toner is transferred via the transfer belt 154 is conveyed to the fixing unit 155. The fixing unit 155 fixes the toner to the sheet 301 (rear surface) by heat and pressure. Subsequently, the sheet 301 passed through the fixing unit 155 is discharged to the discharge tray 247 (the discharge unit) included in the image forming apparatus 100 by the conveyance rollers 334 and 335.

The sheet management table 500 for managing the attribute information of the sheet used for printing in the image forming apparatus 100 is described in detail below with reference to FIG. 5.

A sheet used for printing in the image forming apparatus 100 includes, for example, a sheet used standardly, a sheet already evaluated by a printer manufacturer, and a user-defined sheet obtained by customizing the attribute information of the standard sheet and the evaluated sheet by the user. The attribute information pieces of a plurality of sheets are stored in the RAM 113 or the HDD 115 in a list format as the sheet management table 500. Each data registered in the sheet management table 500 is digital information, such as Extensible Markup Language (XML) and a comma separated value (CSV). Each software module can read and write with respect to the sheet management table 500 stored in the RAM 113 or the HDD 115.

The data (the sheet attribute information) registered in the sheet management table 500 is described in detail below. A sheet name (511) is information for discriminating a sheet used in printing one from the other. A sheet length in the sub scanning direction (512), a sheet length in the main scanning direction (513), a sheet basis weight (514), and a sheet surface property (515) are each physical characteristics of a sheet used for printing. The sheet surface property (515) is an attribute for indicating a physical characteristic of a sheet surface and includes, for example, "coated", i.e., surface coating is applied to increase glossiness and "embossed", i.e., asperity on the surface. A sheet color (516) is an attribute indicating a color of a sheet ground. A pre-print paper (517) is information for identifying whether the sheet used for printing is a pre-print paper or not.

The image forming apparatus 100 corrects a deviation of the print position of the sheet when printing is executed so that an image is printed on an ideal print position without the deviation of the print position. A print position deviation amount of a front surface of the sheet (520) is information indicating a position deviation amount from the ideal print position in the front surface of the sheet. On the other hand, a print position deviation amount of a rear surface of the sheet (521) is information indicating a position deviation amount (also referred to as a geometrical correction amount) from the ideal print position in the rear surface of the sheet.

The print position deviation amounts (520 and 521) include, for example, a print position deviation amount of the sheet in the sub scanning direction (hereinbelow, referred to as a lead position deviation amount). The lead position is a print start position of an image starting from an edge of a test chart on a head in a sheet conveyance direction. An initial value of the lead position is zero. When the lead position deviation amount is adjusted, an illumination start timing of the laser beam illuminating the photosensitive drums 153 (323 to 326) from the laser unit 332 is adjusted. Accordingly, the print start position of the image starting from the edge of the test chart on the head in the sheet conveyance direction is changed.

The print position deviation amounts (520 and 521) further include, for example, a print position deviation amount of the sheet in the main scanning direction (hereinbelow, referred to as a side position deviation amount). The side position is a print start position of the image starting from an edge of the test chart in a direction orthogonal to the sheet conveyance direction. An initial value of the side position is zero. When the side position deviation amount is adjusted, the illumination start timing of the laser beam illuminating the photosensitive drums 153 (323 to 326) from the laser unit 332 is adjusted. Accordingly, the print start position of the image starting from the edge of the test chart in a direction orthogonal to the sheet conveyance direction is changed.

The print position deviation amounts (520 and 521) further include, for example, a deviation amount of an image length (a magnification to an ideal length) in the sub scanning direction and a deviation amount of an image length (a magnification to an ideal length) in the main scanning direction. Initial values of a sub-scanning magnification and a main-scanning magnification are zero. The sub-scanning magnification is adjusted by controlling a driving speed of the transfer belt 154. On the other hand, the main-scanning magnification is adjusted by controlling a clock frequency of the laser beam when the laser unit 332 modulates a digital image signal into the laser beam.

The print position deviation amounts (520 and 521) further include, for example, a right angle correction amount indicating a deviation amount of squareness of a print orientation in the sub scanning direction and the main scanning direction to the sheet. The right angle correction amount is indicated by calculating an ideal perpendicular line with respect to a straight line printed in the sub scanning direction and using a deviation amount of a straight line printed in the main scanning direction from the ideal perpendicular line.

The print position deviation amounts (520 and 521) further include, for example, a trapezoid angle correction amount indicating a deviation amount of expansion and contraction of the sheet. The trapezoid angle correction amount is indicated by a deviation amount of a straight line printed in the sub scanning direction from the print start position to a rear edge of the sub scanning of the sheet from a straight line printed in the sub scanning direction from a rear edge of the main scanning to the rear edge of the sub scanning of the sheet.

These print position deviation amounts (520 and 521) are calculated by scanning the test chart on which a correction marker and an area marker are printed by the scanner unit 130 and detecting a position of the correction marker. The test chart, the correction marker, and the area marker are described in detail below with reference to FIGS. 7A and 7B.

A case is described above in which the adjustment of the print position deviation amounts (520 and 521) is performed by, for example, adjusting the illumination timing of the laser, however, the adjustment method is not limited to this one. The deviation of the print position may be adjusted by shifting an image itself to be printed on a sheet for a predetermined amount and printing. When the print position deviation amount is adjusted, the user may be allowed to arbitrarily specify a shift amount of the image to be printed on the sheet.

Edit of the attribute information of the sheet registered in the sheet management table 500 and addition and registration of a new sheet to the sheet management table 500 can be performed using an edit screen 600 illustrated in FIG. 6A.

The edit screen 600 is displayed, for example, on the display panel of the operation unit 120 and a monitor (not illustrated) of the PC 101.

A sheet selected by the user on the edit screen 600 is highlighted (reverse display). In the example in FIG. 6A, a sheet of "XYZ paper company color 81" is highlighted. The user can add a new sheet to be registered in the sheet management table 500 by pressing a new addition button 601 on the edit screen 600. Further, the user can edit the attribute information of the selected sheet (the highlighted sheet) by pressing an edit button 602 on the edit screen 600. When the user presses the new addition button 601 or the edit button 602, an edit screen 610 illustrated in FIG. 6B is called. The edit screen 610 is displayed, for example, on the display panel of the operation unit 120 and the monitor of the PC 101.

The user can input, on the edit screen 610, each data regarding, for example, the sheet name, the sheet length in the sub scanning direction, the sheet length in the main scanning direction, the basis weight, the surface property, a color, and pre-print paper. The surface property is selected from a list of surface properties that the image forming apparatus 100 can support. The color is selected from a list of colors registered in advance. When the user inputs each data and then presses an end button 611 on the edit screen 610, the data (the sheet attribute information) input at that point is determined and registered in the sheet management table 500.

The user can input, on the edit screen 610, the attribute information pieces regarding the sheet name, the sheet length in the sub scanning direction, the sheet length in the main scanning direction, the basis weight, the surface property, and the color. The user selects one of the surface property from the list of surface properties that the image forming apparatus 100 can support. The user can select an arbitrary color from the list of colors registered in advance. Further, the user can input information indicating whether the sheet to be edited is the pre-print paper or not on the edit screen 610. When the user presses the end button 611 on the edit screen 610, the sheet attribute input at that point is determined and registered in the sheet management table 500.

Figure 13B:
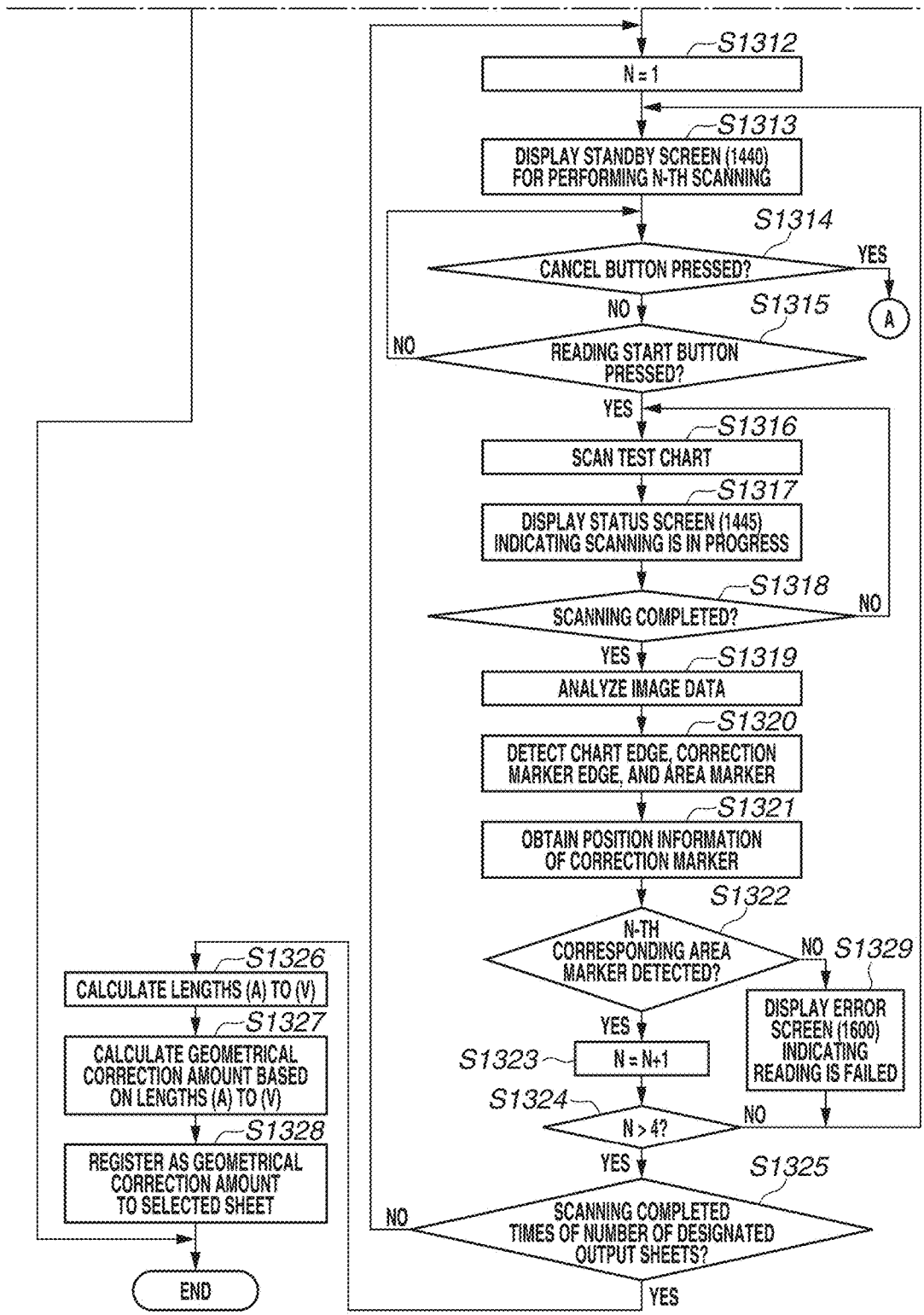
FIG. 13 (including FIGS. 13A and 13B) is a flowchart illustrating an example of control.

When the user presses an adjustment button 603 on the edit screen 600, a series of processing for adjusting the print position of the selected sheet (the highlighted sheet) can be executed. The series of processing for adjusting the print position is described in detail below with reference to a flowchart illustrated in FIG. 13 (including FIGS. 13A and 13B).

An example of a test chart used for adjustment of the print position is described with reference to schematic diagrams in FIGS. 7A and 7B.

Image data for printing a test chart 700 is stored in the RAM 113 or the HDD 115. When the test chart 700 is printed, the image data of the test chart 700 is read from the RAM 113 or the HDD 115 and transferred to the printer engine 150.

Figure 7A:
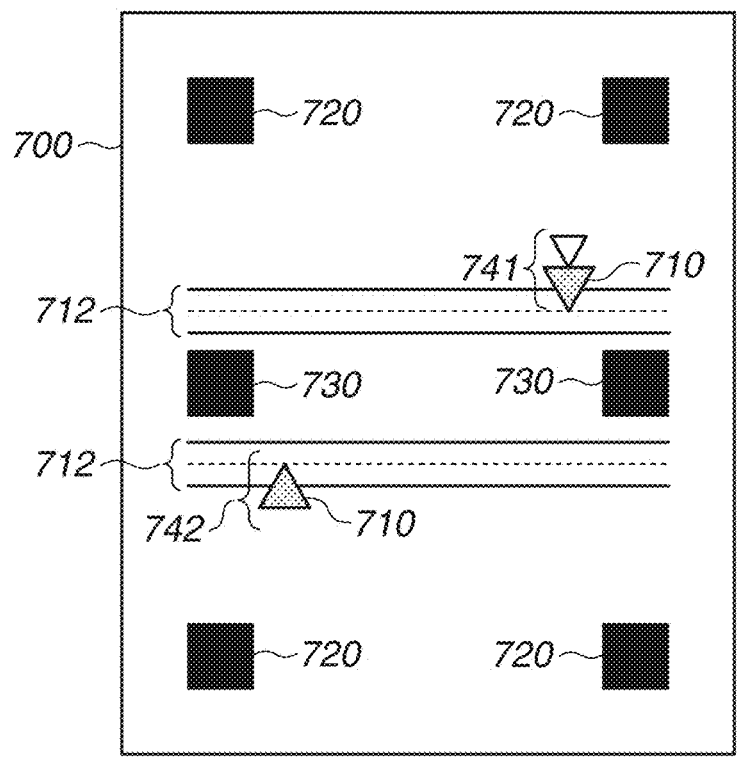
FIGS. 7A and 7B are examples of schematic diagrams of test charts.
Figure 7B:
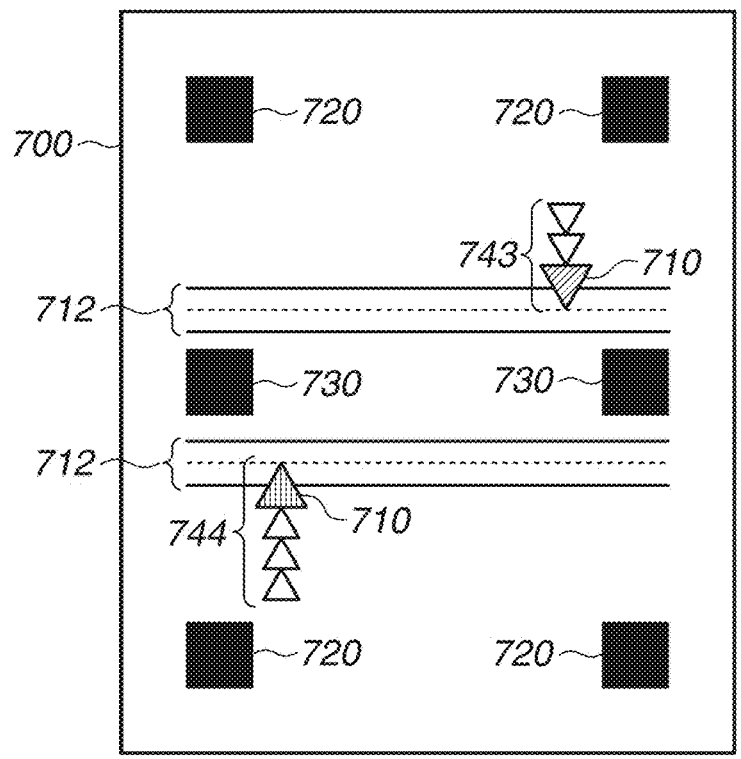

When the print position of the front surface is adjusted on the sheet, as illustrated in FIG. 7A, a correction marker 720 as an object is printed on a specific position (for example, four corners) on the front surface of the sheet. Further, when the print position of the rear surface is adjusted on the sheet, as illustrated in FIG. 7B, the correction marker 720 as an object is printed on a specific position (for example, four corners) on the rear surface of the sheet. The correction marker 720 is formed using a toner having a color of which a difference in reflectance to a common sheet is large (for example, a black toner). As described above, the correction markers 720 are printed four locations each on the front surface and the rear surface of the test chart 700 (eight locations in total).

As described above, when the correction markers 720 are printed without deviation from the print positions, the correction markers 720 are arranged so as to be printed on positions away from an edge of the test chart 700 by a predetermined distance.

Thus, when the positions of the correction markers 720 printed on the front surface of the test chart 700 are measured, the print position deviation amount of the front surface of the sheet is calculated (or obtained). Further, when the positions of the correction markers 720 printed on the rear surface of the test chart 700 are measured, the print position deviation amount of the rear surface of the sheet is calculated (or obtained).

In addition, composition markers 730 are printed two locations each on the front surface and on the rear surface, i.e., four locations in total, of the test chart 700. The composition markers 730 are respectively arranged on the centers of the front surface and the rear surface of the test chart 700 to be printed on positions away from the edge of the test chart 700 by a predetermined distance. The composition markers 730 are used, when an upper portion and a lower portion of the front surface and an upper portion and a lower portion of the rear surface of the test chart 700 are respectively scanned by the scanner unit 130, to composite the upper portion and the lower portion of the respective surfaces. A modification may be adopted in which the composition marker 730 is not printed on the test chart 700. For example, when the CPU 114 does not calculate the right angle correction amount and the trapezoid angle correction amount, the composition marker 730 may not be printed on the test chart 700. Further, for example, when the right angle correction amount and the trapezoid angle correction amount are calculated directly using the image data pieces of the upper portion and the lower portion of the respective surfaces without compositing the image data pieces generated by scanning the test chart 700, the composition marker 730 may not be printed on the test chart 700. Calculation methods of the right angle correction amount and the trapezoid angle correction amount are described below with reference to FIG. 9.

Further, alignment lines 712 are printed on the upper portion and the lower portion of the front surface and the upper portion and the lower portion of the rear surface, i.e., four locations in total, of the test chart 700. The alignment lines 712 are arranged so as to be printed on positions away from the composition markers 730 by a predetermined distance. The alignment line 712 is a line used as an indication of a location for arranging an alignment sheet when the user places the test chart 700 between the alignment sheet (described below in FIG. 10) and the document positioning glass plate 202. The user places the test chart 700 between the alignment sheet and the document positioning glass plate 202 using, as an indication, the alignment line 712 of the test chart 700. More specifically, the user places the test chart 700 so that an edge of the alignment sheet fits within solid lines of the alignment line 712, in a state where the test chart 700 is placed between the alignment sheet and the document positioning glass plate 202.

Further, alignment markers 710 (also referred to as marks of the test chart 700) are printed two locations each on the front surface and on the rear surface, i.e., four locations in total, of the test chart 700. The alignment marker 710 is arranged so that a vertex of the alignment marker 710 comes to the dotted line at the center of the alignment line 712. The user matches positions of the alignment marker 710 of the test chart 700 and an alignment marker of the alignment sheet (described below with reference to FIGS. 10A and 10B). When the positions of the alignment marker 710 of the test chart 700 and the alignment marker of the alignment sheet are matched, the edge of the test chart 700 fits within an area of a rear surface of the alignment sheet (an area printed in black).

Figure 10A:
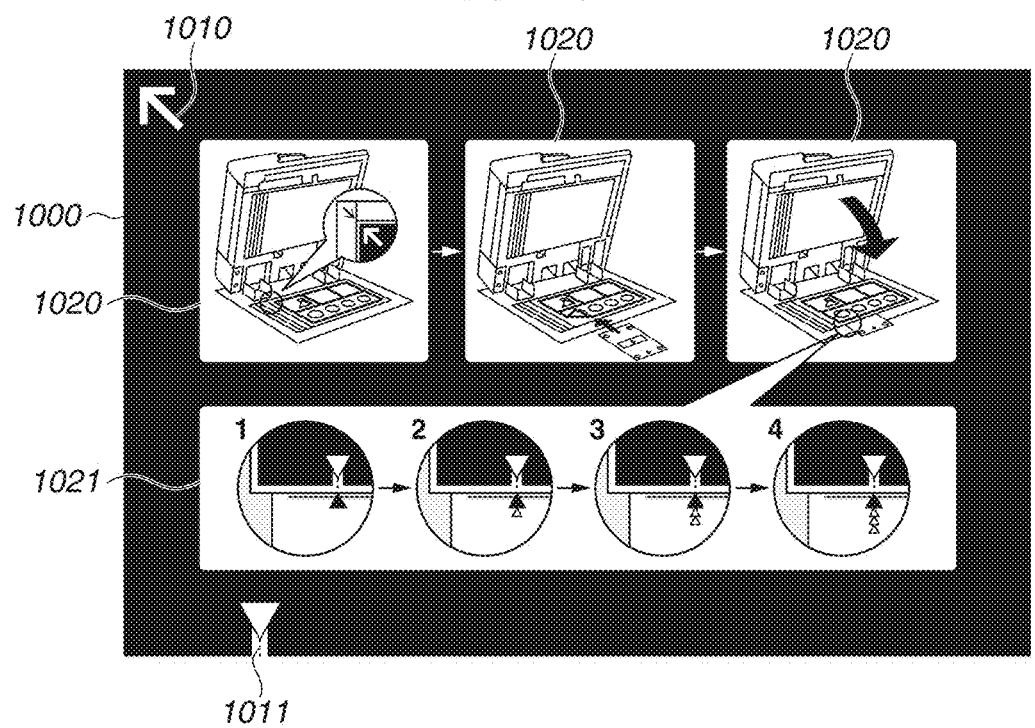
FIGS. 10A and 10B are examples of schematic diagrams of test charts.
Figure 10B:
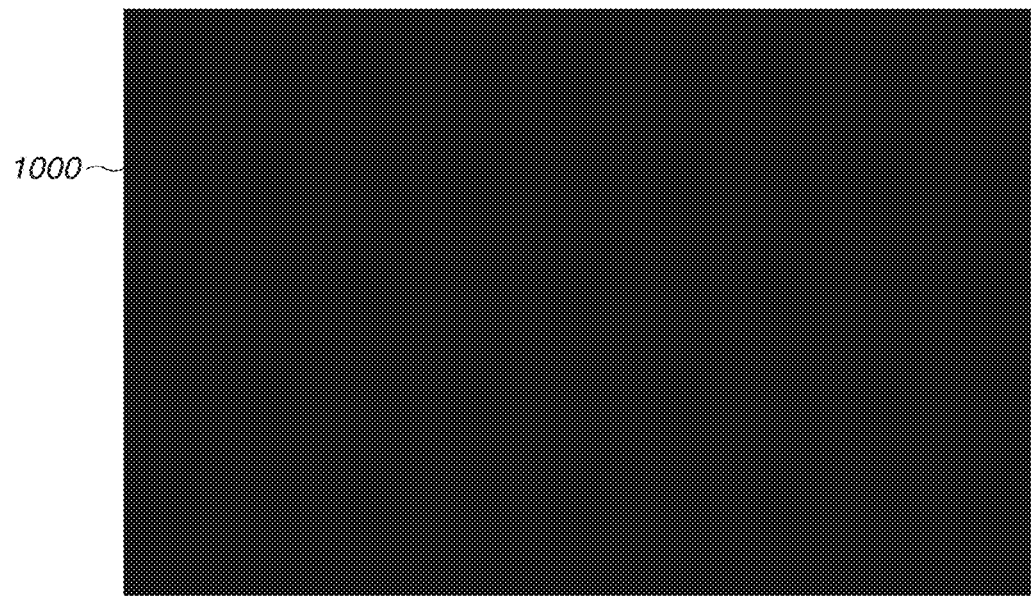

An example of a schematic diagram of the alignment sheet is described with reference to FIGS. 10A and 10B. FIG. 10A illustrates a front surface of an alignment sheet 1000, and FIG. 10B illustrates a rear surface of the alignment sheet 1000. As illustrated in FIG. 10A, a mark 1010 as a reference position for placing the alignment sheet 1000 on the document positioning glass plate 202 is applied on the front surface of the alignment sheet 1000. An alignment marker 1011 (also referred to as a mark of the alignment sheet 1000) as a reference position for placing the alignment sheet 1000 on the test chart 700 placed on the document positioning glass plate 202 is applied on the front surface of the alignment sheet 1000. Images 1020 and 1021 indicating a placing method of the test chart 700 are printed on the front surface of the alignment sheet 1000.

The images 1020 presents the user with procedures for placing the alignment sheet 1000 so that the rear surface thereof is brought into contact with the document positioning glass plate 202 and further sandwiching the test chart 700 at a predetermined position between the document positioning glass plate 202 and the alignment sheet 1000. When the test chart 700 is placed on the document positioning glass plate 202 in the above-described manner, a difference in reflectance becomes large between the edge of the test chart 700 and the rear surface of the alignment sheet 1000. For example, when a ground color of the test chart 700 is white, and the rear surface of the alignment sheet is black, the difference in reflectance becomes large between the edge of the test chart 700 and the rear surface of the alignment sheet 1000. At that time, the CPU 114 can accurately detect the edge of the test chart 700.

The image 1020 also presents the user with the procedure for fitting the mark 1010 to a corner of the document positioning glass plate 202. When a size of the alignment sheet 1000 is fixed as described above, the alignment marker 1011 comes to a certain position of the document positioning glass plate 202. When scanning is executed in a state in which positions of the alignment marker 1011 of the alignment sheet 1000 and the alignment marker 710 of the test chart 700 are matched, the correction marker 720 of the test chart 700 comes to a predetermined position of the generated image data.

The image 1021 presents the user how to match the positions of the alignment marker 1011 of the alignment sheet 1000 and the alignment marker 710 of the test chart 700 together with an order of scanning.

It is described on the premise that the size of the alignment sheet 1000 is one fixed type, however, the size of the alignment sheet 1000 may be selected without limiting to the above case. The size of the alignment sheet 1000 may be changed by country, for example, a 11*17 sheet size and an A3 sheet size may be respectively used in a country using a sheet of inch system and a country using a sheet of AB system. An area for searching for the correction marker from the image data generated by scanning the test chart 700 may be narrowed in response to a size of the alignment sheet 1000 to be used. An area for searching for the correction marker 720 from the image data generated by scanning the test chart 700 may be expanded so as to be able to support when either of the A3 size and the 11*17 size is used as the size of the alignment sheet 1000. A modification may be adopted in which the alignment marker 1011 of the alignment sheet 1000 is not used, and an entire area may be regarded as an area for searching for the correction marker 720 from the image data generated by scanning the test chart 700.

An example of a positional relationship between the test chart 700 and the alignment sheet 1000 placed on the document positioning glass plate 202 is described.

The user opens the pressing plate 40 and places the test chart 700 on the document positioning glass plate 202. The test chart 700 is placed with its surface to be read facing downward on the document positioning glass plate 202. Subsequently, the user places the alignment sheet 1000 on the test chart 700 so that the edge of the test chart 700 can be easily detected in analysis of the image data by the CPU 114. At that time, the user places the alignment sheet 1000 on the test chart 700 so that the mark 1010 of the alignment sheet 1000 matches with the reference position (upper left) of the document positioning glass plate 202. Further, the user places the test chart 700 on the document positioning glass plate 202 so that the alignment marker 1011 of the alignment sheet 1000 matches with the alignment marker 710 of the test chart 700 as illustrated in the image 1021 of the alignment sheet 1000.

Now, the test chart 700 is further described with reference to the schematic diagrams in FIGS. 7A and 7B.

Area markers 741 to 744 are printed on the test chart 700. The area markers 741 to 744 are printed on the test chart 700 for the number corresponding to an order for placing the test chart 700 on the document positioning glass plate 202 for presenting the user with the order of placing.

The area marker 741 is constituted of two markers in total including the alignment marker 710 and used for performing a second scanning. The area marker 742 is constituted of one marker in total including the alignment marker 710 and used for performing a first scanning. The area marker 743 is constituted of three markers in total including the alignment marker 710 and used for performing a third scanning. The area marker 744 is constituted of four markers in total including the alignment marker 710 and used for performing a fourth scanning.

For example, the scanner unit 130 scans the upper portion of the rear surface of the test chart 700 in the first scanning and scans the lower portion of the rear surface of the test chart 700 in the second scanning. Subsequently, the scanner unit 130 scans the lower portion of the front surface of the test chart 700 in the third scanning and scans the upper portion of the front surface of the test chart 700 in the fourth scanning. As described above, a scanning order is associated with an area of the test chart 700 to be scanned, so that the CPU 114 can identify that the image data generated by scanning is the one obtained by reading an image in which area of the test chart 700.

Figure 11:
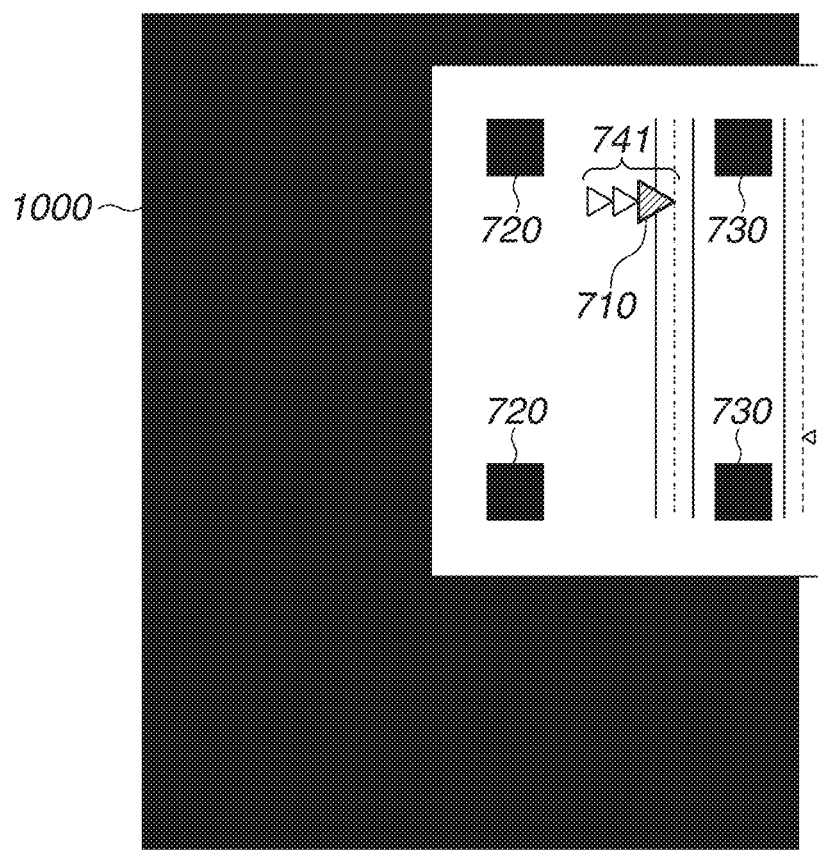
FIG. 11 is an example of image data.

In the above-described example, the CPU 114 identifies that the image data generated by the first scanning is the image data generated by reading an image in the upper portion of the rear surface of the test chart 700. The CPU 114 identifies that the image data generated by the second scanning is the image data generated by reading an image in the lower portion of the rear surface of the test chart 700. The CPU 114 identifies that the image data generated by the third scanning is the image data generated by reading an image in the lower portion of the front surface of the test chart 700. The CPU 114 identifies that the image data generated by the fourth scanning is the image data generated by reading an image in the upper portion of the front surface of the test chart 700. Thus, in order to perform the first scanning, the user butts the vertex of the alignment marker 710 (also referred to as a first mark of the test chart 700) included in the area marker 742 against a vertex of the alignment marker 1011 as illustrated in the image 1021 in FIG. 10A. The scanner unit 130 scans the upper portion of the rear surface of the test chart 700 placed on the document positioning glass plate 202 in a state in which the vertex of the alignment marker 710 included in the area marker 742 is butted against the vertex of the alignment marker 1011. The upper portion of the rear surface of the test chart 700 is an area including the area marker 743 as illustrated in FIG. 7B. FIG. 11 illustrates the image data that the CPU 114 generates by scanning the upper portion of the rear surface of the test chart 700 at that time.

Further, in order to perform the second scanning, the user butts the vertex of the alignment marker 710 (also referred to as a second mark of the test chart 700) included in the area marker 741 against the vertex of the alignment marker 1011 as illustrated in the image 1021. The scanner unit 130 scans the lower portion of the rear surface of the test chart 700 placed on the document positioning glass plate 202 in a state in which the vertex of the alignment marker 710 included in the area marker 741 is butted against the vertex of the alignment marker 1011 of the alignment sheet 1000. The lower portion of the rear surface of the test chart 700 is an area including the area marker 744 as illustrated in FIG. 7B.

Further, in order to perform the third scanning, the user butts the vertex of the alignment marker 710 (also referred to as a third mark of the test chart 700) included in the area marker 743 against the vertex of the alignment marker 1011 as illustrated in the image 1021. The scanner unit 130 scans the lower portion of the front surface of the test chart 700 placed on the document positioning glass plate 202 in a state in which the vertex of the alignment marker 710 included in the area marker 743 is butted against the vertex of the alignment marker 1011 of the alignment sheet 1000. The lower portion of the front surface of the test chart 700 is an area including the area marker 742 as illustrated in FIG. 7A.

Further, in order to perform the fourth scanning, the user butts the vertex of the alignment marker 710 (also referred to as a fourth mark of the test chart 700) included in the area marker 744 against the vertex of the alignment marker 1011 as illustrated in the image 1021. The scanner unit 130 scans the upper portion of the front surface of the test chart 700 placed on the document positioning glass plate 202 in a state in which the vertex of the alignment marker 710 included in the area marker 744 is butted against the vertex of the alignment marker 1011 of the alignment sheet 1000. The upper portion of the front surface of the test chart 700 is an area including the area marker 741 as illustrated in FIG. 7A.

The alignment markers 710 included in the respective area markers 741 to 744 are respectively formed in different colors (for example, blue, yellow, green, and red). The colors of the alignment markers 710 included in the respective area markers 741 to 744 are different from a color of the correction marker 720 (for example, black). For example, the color of the alignment marker 710 included in the area marker 741 is yellow, and the color of the alignment marker 710 included in the area marker 742 is blue. Further, for example, the color of the alignment marker 710 included in the area marker 743 is green, and the color of the alignment marker 710 included in the area marker 744 is red.

The CPU 114 focuses on a color included in the image data generated by scanning the test chart 700 and can determine whether the scanned surface of the test chart 700 is the upper portion or the lower portion of the front surface or the upper portion or the lower portion of the rear surface. For example, when identifying that the color included in the image data generated by scanning the test chart 700 is blue, the CPU 114 determines that the scanned surface of the test chart 700 is the lower portion of the front surface. Further, for example, when identifying that the color included in the image data generated by scanning the test chart 700 is green, the CPU 114 determines that the scanned surface of the test chart 700 is the upper portion of the rear surface.

In this regard, a processing load on the CPU 114 is lower when determining the colors of the alignment markers 710 included in the respective area markers 741 to 744 than when determining the number of the markers included in the respective area markers 741 to 744. Accordingly, the CPU 114 focuses on the colors of the alignment markers 710 included in the respective area markers 741 to 744 and can quickly determine whether the scanned surface of the test chart 700 is the upper portion or the lower portion of the front surface or the upper portion or the lower portion of the rear surface.

A modification may be adopted in which the alignment markers 710 included in the respective area markers 741 to 744 are formed in the same color. In this case, the CPU 114 may focus on the number of the markers included in the respective area markers 741 to 744 and determines whether the scanned surface of the test chart 700 is the upper portion or the lower portion of the front surface or the upper portion or the lower portion of the rear surface.

After the scanner unit 130 respectively scans the upper portion and the lower portion of the front surface of the test chart 700, the CPU 114 overlaps the positions of the composition markers 730 existing in the generated image data pieces and extracts the entire front surface of the test chart 700. Further, after the scanner unit 130 respectively scans the upper portion and the lower portion of the rear surface of the test chart 700, the CPU 114 overlaps the positions of the composition markers 730 existing in the generated image data pieces and extracts the entire rear surface of the test chart 700. Accordingly, the CPU 114 can accurately calculate a relative positional relationship of the correction markers 720 existing on the four corners of the front surface (or the rear surface) of the test chart 700.

A case when the print position is adjusted using the test chart 700 is described below with reference to FIGS. 8A, 8B, 9, 12A, and 12B.

Figure 8A:
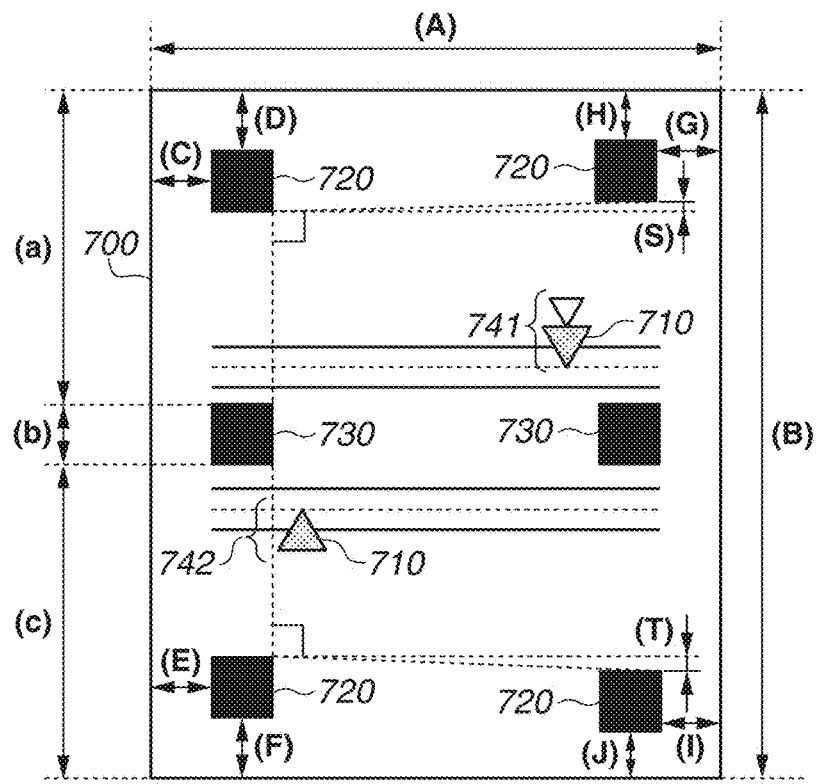
FIGS. 8A and 8B are examples of schematic diagrams of test charts.
Figure 8B:
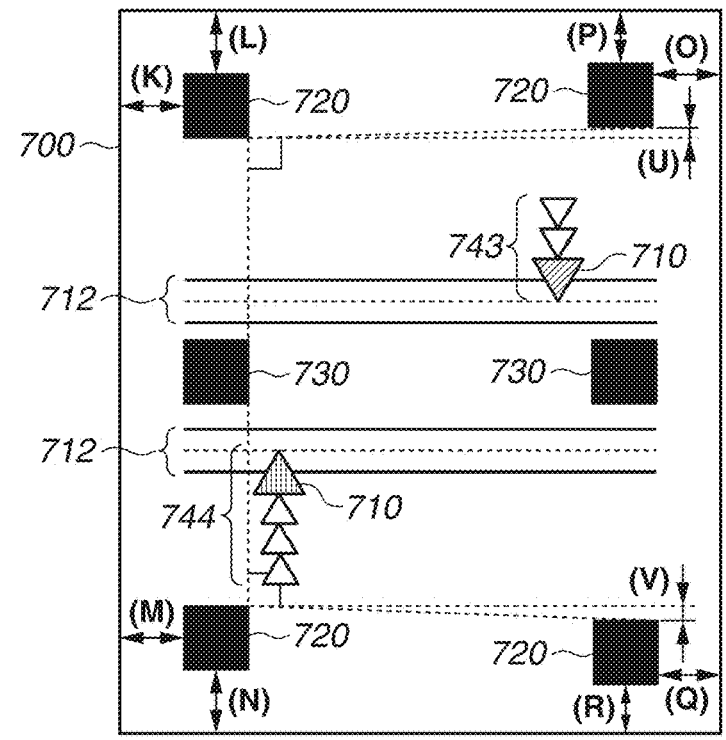

In order to measure the positions of the correction markers 720 on the front surface of the test chart 700, portions (A) to (J), (S), and (T) on the front surface of the test chart 700 as illustrated in the schematic diagram in FIG. 8A are measured. Further, in order to measure the positions of the correction markers 720 on the rear surface of the test chart 700, portions (K) to (R), (U), and (V) on the rear surface of the test chart 700 as illustrated in the schematic diagram in FIG. 8B are measured. (The portions (A) to (V) also referred to as lengths (A) to (V) below.)

When an ideal perpendicular line passing through the correction marker 720 is drawn with respect to a straight line connecting the correction marker 720 and the composition marker 730, the portions (S) to (V) each represent a deviation amount in the sub scanning direction of the other the correction marker 720 on the same main scanning position from the ideal perpendicular line. Thus, ideal lengths of the portions (S) to (V) are respectively zero.

The portion (A) is a length of the test chart 700 in the sub scanning direction, and the portion (B) is a length of the test chart 700 in the main scanning direction. An ideal length of the portion (A) is the sheet length in the sub scanning direction (512) registered in the sheet management table 500. An ideal length of the portion (B) is the sheet length in the main scanning direction (513) registered in the sheet management table 500. On the other hand, the lengths (C) to (R) each are a distance from the correction marker 720 to the nearest edge of the test chart 700.

As a measurement method of the lengths (A) to (R), there are a method for manually measuring and a method for automatically calculating. In the method for manually measuring, the user actually measures the lengths (A) to (R) using a ruler on the test chart 700.

On the other hand, in the method for automatically calculating, the scanner unit 130 scans the test chart 700. More specifically, an image (an image of an entire area of the test chart 700 and a partial area of the alignment sheet 1000) is scanned in a state in which the test chart 700 is placed on the document positioning glass plate 202, and the alignment sheet 1000 is further placed on the test chart 700. The image (the image of the entire area of the test chart 700 and the partial area of the alignment sheet 1000) is also referred to as an image of the test chart 700 below.

Figure 12A:
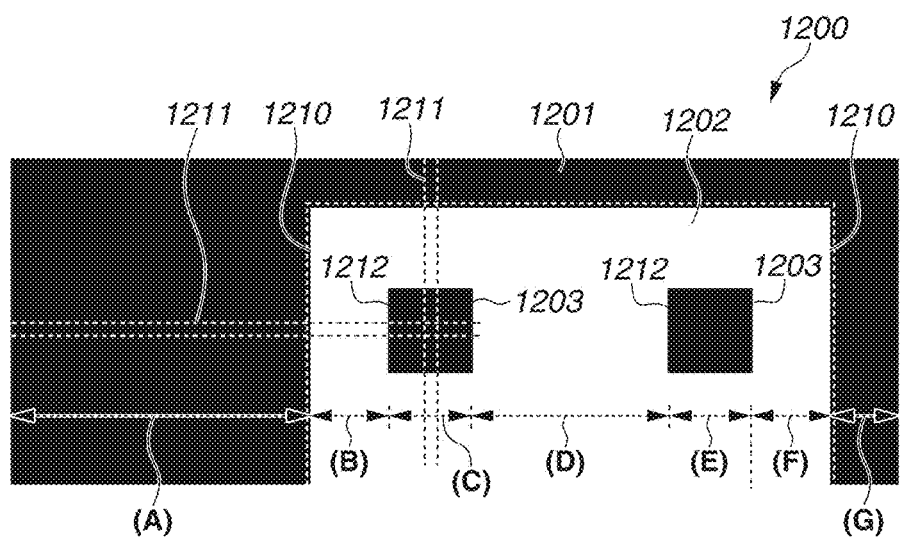
FIGS. 12A and 12B illustrate detection processing.

FIG. 12A illustrates a part of the image data generated by the scanner unit 130 reading the image in the state in which the test chart 700 is placed on the document positioning glass plate 202, and the alignment sheet 1000 is further placed on the test chart 700.

The CPU 114 analyzes image data 1200 generated by reading the image of the test chart 700. The CPU 114 detects the edge of the test chart 700 and an edge of the correction marker 720 (in other words, a boundary between the ground of the test chart 700 and the correction marker 720) from a density difference as a result of the analysis. Subsequently, the CPU 114 calculates the lengths (A) to (R) illustrated in FIGS. 8A and 8B from the detected edge of the test chart 700 and edge of the correction marker 720. The analysis processing of the image data of the test chart 700 is described in detail below with reference to FIGS. 12A and 12B.

A calculation method of the print position deviation amount based on the position of the correction marker 720 is described with reference to FIG. 9.

Each of a measured value (910), an ideal value (911), and a print position deviation amount (912) of the lead position, the side position, the main-scanning magnification, the sub-scanning magnification, the right angle correction amount, and the trapezoid angle correction amount in the front surface and the rear surface of the test chart 700 is defined in a table 900 shown in FIG. 9. The table 900 is stored in the RAM 113 or the HDD 115.

For example, the measured value (910) of "the lead position" in the front surface of the test chart 700 is calculated from actual measured values of the lengths (C) and (E) illustrated in FIGS. 8A and 8B using an expression shown in the table 900. In other words, the lead position is an average value of distances from the edge of the test chart 700 on the head in the sheet conveyance direction to the corresponding correction markers 720.

Further, for example, the measured value (910) of "the side position" in the front surface of the test chart 700 is calculated from actual measured values of the lengths (F) and (J) illustrated in FIGS. 8A and 8B using an expression shown in the table 900. In other words, the side position is an average value of distances from the edge of the test chart 700 on the left side in the sheet conveyance direction to the corresponding correction markers 720.

Further, for example, the measured value (910) of "the main-scanning magnification" in the front surface of the test chart 700 is calculated from actual measured values of the lengths (B), (D), (F), (H), and (J) illustrated in FIGS. 8A and 8B using an expression shown in the table 900. In other words, the main-scanning magnification is an average value of distances between the correction markers 720 aligned on the same scanning line in the main scanning direction.

Further, for example, the measured value (910) of "the sub-scanning magnification" in the front surface of the test chart 700 is calculated from actual measured values of the lengths (A), (C), (E), (G), and (I) illustrated in FIGS. 8A and 8B using an expression shown in the table 900. In other words, the sub-scanning magnification is an average value of distances between the correction markers 720 aligned on the same scanning line in the sub scanning direction.

As shown in the table 900, the ideal values (911) of "the lead position" and "the side position" are each 1 cm. In other words, the correction markers 720 are each ideally printed on a position 1 cm away from the corresponding edge of the test chart 700.

Further, as shown in the table 900, the ideal values (911) of "the main-scanning magnification" is a value obtained by subtracting 2 cm from the sheet length in the main scanning direction of each sheet registered in the sheet management table 500. Similarly, the ideal value (911) of "the sub-scanning magnification" is a value obtained by subtracting 2 cm from the sheet length in the sub scanning direction of each sheet registered in the sheet management table 500.

Further, as shown in the table 900, the print position deviation amount (912) of each of "the lead position", "the side position", "the main-scanning magnification", and "the sub-scanning magnification" is calculated using the corresponding measured value (910) and ideal value (911).

More specifically, the print position deviation amounts (912) of "the lead position" and "the side position" are each calculated by subtracting the ideal value (911) from the measured value (910) (a unit is "mm"). On the other hand, the print position deviation amounts (912) of "the main-scanning magnification" and "the sub-scanning magnification" are each calculated by dividing a value obtained by subtracting the ideal value (911) from the measured value (910) by the ideal value (911) (a unit is "%").

As shown in the table 900, the measured value (910) of "the right angle correction amount" is calculated from actual measured values of the lengths (S) and (V) illustrated in FIGS. 8A and 8B using an expression shown in the table 900. The right angle correction amount is a deviation amount in the sub scanning direction of the correction marker 720 aligned on the same scanning line of the other correction marker 720 in the main scanning direction with respect to a perpendicular line of a straight line connecting the composition marker 730 and the other correction marker 720 aligned on the same scanning line in the sub scanning direction. As shown in the table 900, the ideal value (911) of "the right angle correction amount" is 0 cm. Further, as shown in the table 900, the print position deviation amount (912) of "the right angle correction amount" is the measured value (910). In other words, the measured value (910) of "the right angle correction amount" is directly used as a correction amount.

On the other hand, as shown in the table 900, the measured value (910) of "the trapezoid angle correction amount" is calculated from the actual measured values of the lengths (B), (D), (F), (H), and (J) illustrated in FIGS. 8A and 8B using an expression shown in the table 900. The trapezoid angle correction amount is a difference of the distances between the correction markers 720 aligned on the same scanning line in the sub scanning direction. As shown in the table 900, the ideal value (911) of "the trapezoid angle correction amount" is 0 cm. Further, as shown in the table 900, the print position deviation amount (912) of "the trapezoid angle correction amount" is the measured value (910). In other words, the measured value (910) of "the trapezoid angle correction amount" is directly used as a correction amount.

The print position deviation amounts (912) calculated as described above are registered in the sheet management table 500 as the sheet attribute information.

A method for detecting the edge of the test chart 700 and the edge of the correction marker 720 based on the image data generated by scanning the test chart 700 is described with reference to FIGS. 12A and 12B.

First, a part of the image data 1200 generated by scanning the test chart 700 placed on the document positioning glass plate 202 is described with reference to FIG. 12A.

An area 1201 is an image data area based on the alignment sheet 1000 in the image data 1200. An area 1202 is an image data area based on the ground of the test chart 700 in the image data 1200. An area 1203 is an image data area based on the correction marker 720 of the test chart 700 in the image data 1200. An edge 1210 is an edge of the area 1202 (in other words, the edge of the test chart 700). An edge 1212 is an edge of the area 1203 (in other words, the edge of the correction marker 720).

An analysis range 1211 is a range in which analysis of the image data 1200 is performed (in other words, a target range of the analysis processing). The analysis of the image data 1200 is performed by measuring density changes in the main scanning direction and in the sub scanning direction from the edge of the image data 1200 in a pixel unit. The analysis of the image data 1200 may be performed by measuring the density changes in the main scanning direction and in the sub scanning direction from the edge of the image data 1200 in a window unit and further calculating an average value in a pixel unit.

The CPU 114 detects the area 1201, the area 1202, the area 1203, the edge 1210, and the edge 1212 from the measured results. A unit of measurement may be a unit smaller or larger than the pixel unit. In addition, a reading interval may be constant or thinned.

An example of an analysis result of the image data 1200 in the analysis range 1211 is described with reference to a histogram 1220 in FIG. 12B. The density measurement of the image data 1200 in the analysis range 1211 is performed from the edge of the image data 1200.

Figure 12B:
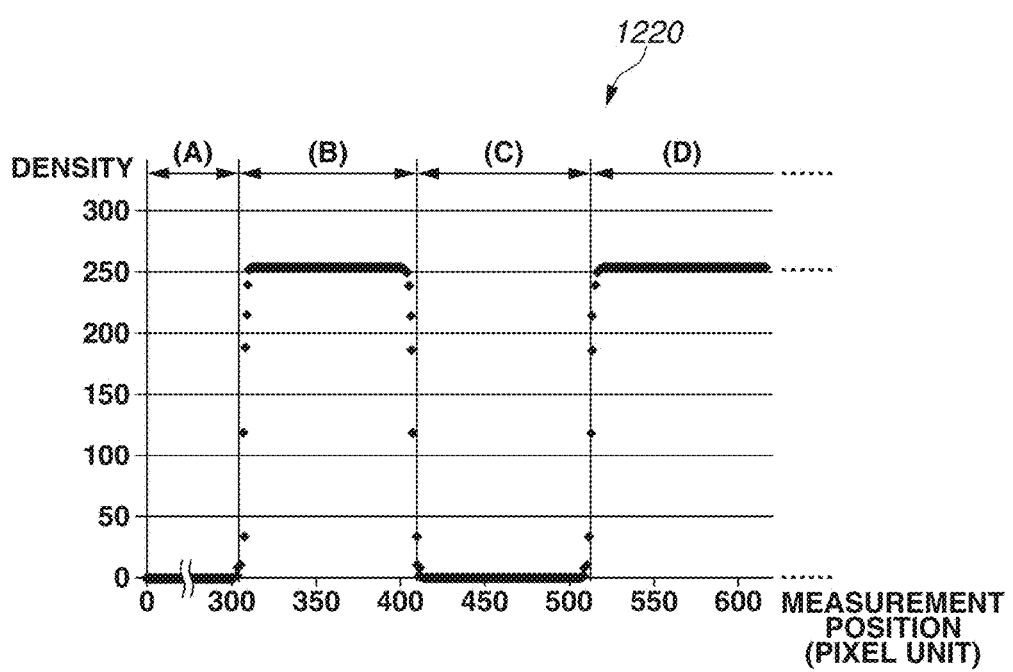

First, the CPU 114 detects a density in the area 1201 (corresponding to a section (A) in FIGS. 12A and 12B). Subsequently, the CPU 114 detects a density in the area 1202 between the area 1201 and the area 1203 (corresponding to a section (B) in FIGS. 12A and 12B). Subsequently, the CPU 114 detects a density in the area 1203 between the two areas 1202 (corresponding to a section (C) in FIGS. 12A and 12B). Subsequently, the CPU 114 detects a density in the area 1202 between the two areas 1203 (corresponding to a section (D) in FIGS. 12A and 12B). Subsequently, the CPU 114 detects a density in the area 1203 between the two areas 1202 (corresponding to a section (E) in FIGS. 12A and 12B). Subsequently, the CPU 114 detects a density in the area 1202 between the area 1203 and the area 1201 (corresponding to a section (F) in FIGS. 12A and 12B). Subsequently, the CPU 114 detects a density in the area 1201 (corresponding to a section (G) in FIGS. 12A and 12B).

Based on these measurement results, the CPU 114 calculates a range of the image printed on the test chart 700 from the measurement positions of the sections (A) to (G) in the image data 1200. Further, the CPU 114 detects that the areas 1203 in the section (C) and the section (E) are based on the density of the correction marker 720 printed on the test chart 700. Furthermore, the CPU 114 detects that the areas 1201 in the section (A) and the section (G) are based on the density of a ground of the alignment sheet 1000.

The CPU 114 further detects, from the detected results, a location at which the density is changed between the section (A) and the section (B) as the edge 1210 (in other words, the edge (a left edge) of the test chart 700). The CPU 114 further detects a location at which the density is changed between the section (B) and the section (C) as the edge 1212 (in other words, the edge (a left edge) of the correction marker 720 on a left side). The CPU 114 further detects a location at which the density is changed between the section (C) and the section (D) as the edge 1212 (in other words, the edge (a right edge) of the correction marker 720 on the left side). The CPU 114 further detects a location at which the density is changed between the section (D) and the section (E) as the edge 1212 (in other words, the edge (a left edge) of the correction marker 720 on a right side). The CPU 114 further detects a location at which the density is changed between the section (E) and the section (F) as the edge 1212 (in other words, the edge (a right edge) of the correction marker 720 on the right side). The CPU 114 further detects a location at which the density is changed between the section (F) and the section (G) as the edge 1210 (in other words, the edge (a right edge) of the test chart 700).

Based on the above-described detected results, the CPU 114 calculates a distance from the edge (the left edge) of the test chart 700 to the edge (the left edge) of the correction marker 720 on the left side as the length (C) of the test chart 700.

The CPU 114 further calculates a distance from the edge (the right edge) of the correction marker 720 on the right side to the edge (the right edge) of the test chart 700 as the length (G) of the test chart 700.

The CPU 114 further calculates a distance from the edge (the left edge) of the test chart 700 to the edge (the right edge) of the test chart 700 as the length (A) of the test chart 700.

The calculation method of the lengths (C) and (G) of the test chart 700 is described above, however, the lengths (E) and (I), (D) and (F), and (H) and (J) of the test chart 700 can be calculated using the similar method. Further, the calculation method of the length (A) of the test chart 700 is described above, however, the length (B) of the test chart 700 can be calculated using the similar method.

Since the edge of the test chart 700 and the edge of the correction marker 720 are detected as described above, the CPU 114 can automatically calculate the lengths (A) to (R) of the test chart 700. In the above-described FIGS. 12A and 12B, a case is described in which the edge of the test chart 700 and the position of the correction marker 720 are calculated from changes in luminance values, however, the position of the composition marker 730 can be similarly calculated from a change in a luminance value.

In order to adjust a position at which an image is printed on a sheet, it is necessary that the respective print positions of the edge of the test chart 700 and a plurality of the correction markers 720 are accurately detected from the image data generated by reading the image of the test chart 700. Thus, the image forming apparatus prints the plurality of the first images indicating the print positions and the second image indicating the reading order of the plurality of the first images on a sheet. The image forming apparatus then obtains the print positions of the plurality of the first images printed on the sheet based on image data generated by reading the plurality of the first images in the reading order indicated by the second image. Subsequently, the image forming apparatus adjusts the position at which the image is printed on the sheet based on the obtained print positions of the plurality of the first images. In other words, the user can understand how to place the sheet by looking at the sheet on which the plurality of images indicating the print positions is printed in order to adjust the position at which the image is printed on the sheet. The processing is described in detail below.

A series of processing for adjusting the print position according to the image forming apparatus 100 is described with reference to a flowchart illustrated in FIG. 13. The processing is performed by the CPU 114 in the controller unit 110 executing the control program read from the ROM 112 or the HDD 115 and developed in the RAM 113. The processing in FIG. 13 is started, for example, when the edit screen 600 in FIG. 6A is displayed on the display panel of the operation unit 120, and a user presses the adjustment button 603.

In step S1301, the CPU 114 displays a selection screen 1400 illustrated in FIG. 14A on the display panel of the operation unit 120. The selection screen 1400 is a screen for receiving a selection either one of a "use scanner" button (1402) and a "not use scanner" button (1401) as a print position adjustment method from the user.

In step S1302, the CPU 114 determines whether the use of the scanner is selected as the print position adjustment method. When the user presses the "use scanner" button (1402), the CPU 114 determines as YES and advances the processing to step S1303. Whereas, when the user presses the "not use scanner" button (1401), the CPU 114 determines as NO and advances the processing to step S1339. The processing in steps S1339 to S1337 is described below.

First, the print position adjustment method using the scanner unit 130 is described in steps S1303 to S1329.

In step S1303, the CPU 114 displays a designation screen 1410 illustrated in FIG. 14B on the display panel of the operation unit 120. The designation screen 1410 is a screen for receiving designation of the number of output sheets of the test chart 700 to be printed for the print position adjustment from the user. When a plurality of the sheets (for example, 10 sheets) of the test chart 700 is scanned, and the average values of the lengths (A) to (V) illustrated in FIGS. 8A and 8B are calculated, accuracy of the geometrical correction amount can be improved. Therefore, the user designates the number of output sheets of the test chart 700 to be printed for the print position adjustment via the designation screen 1410. The designated number of output sheets is stored in the RAM 113.

Subsequently, in step S1304, the CPU 114 determines whether a cancel button (1411) is pressed via the designation screen 1410. When it is determined that the cancel button (1411) is pressed (YES in step S1304), the CPU 114 returns the processing to step S1301. Whereas, when it is determined that the cancel button (1411) is not pressed (NO in step S1304), the CPU 114 advances the processing to step S1305.

In step S1305, the CPU 114 determines whether a "next" button (1412) is pressed via the designation screen 1410. When it is determined that the "next" button (1412) is pressed (YES in step S1305), the CPU 114 advances the processing to step S1306. Whereas, when it is determined that the "next" button (1412) is not pressed (NO in step S1305), the CPU 114 returns the processing to step S1304.

In step S1306, the CPU 114 displays a selection screen 1420 illustrated in FIG. 14C on the display panel of the operation unit 120. The selection screen 1420 is a screen for receiving a selection of a sheet to be used for the test chart 700 from the user. A list 1421 as candidates of sheets used for the test chart 700 is displayed on the selection screen 1420. The list 1421 is a list of sheets stored in the cassette 351 to 354 and the manual feed tray 350. As a modification of the list 1421, a list of sheets registered in the sheet management table 500 may be adopted. The user selects a sheet of which a print position is adjusted from the list 1421 via the selection screen 1420. When the user selects the sheet on the selection screen 1420, information indicating the selected sheet is highlighted (reverse display) in the list 1421.

In step S1307, the CPU 114 determines whether a cancel button 1422 is pressed via the selection screen 1420. When it is determined that the cancel button 1422 is pressed (YES in step S1307), the CPU 114 returns the processing to step S1301. Whereas, when it is determined that the cancel button 1422 is not pressed (NO in step S1307), the CPU 114 advances the processing to step S1308.

In step S1308, the CPU 114 determines whether a print start button 1423 is pressed via the selection screen 1420. When it is determined that the print start button 1423 is pressed (YES in step S1308), the CPU 114 advances the processing to step S1309. Whereas, when it is determined that the print start button 1423 is not pressed (NO in step S1308), the CPU 114 returns the processing to step S1307.

In step S1309, the CPU 114 instructs the image forming unit 151 to print the test chart 700 on the sheet selected on the selection screen 1420. At that time, the image data of the test chart 700 is read from the RAM 113 or the HDD 115 and transferred to the printer engine 150. The image forming unit 151 which receives the print instruction prints the test chart 700 on a sheet fed from the feeding unit 140 (in other words, the sheet selected on the selection screen 1420). The sheet on which the test chart 700 is printed is discharged to the discharge tray 247.

Figure 14D:
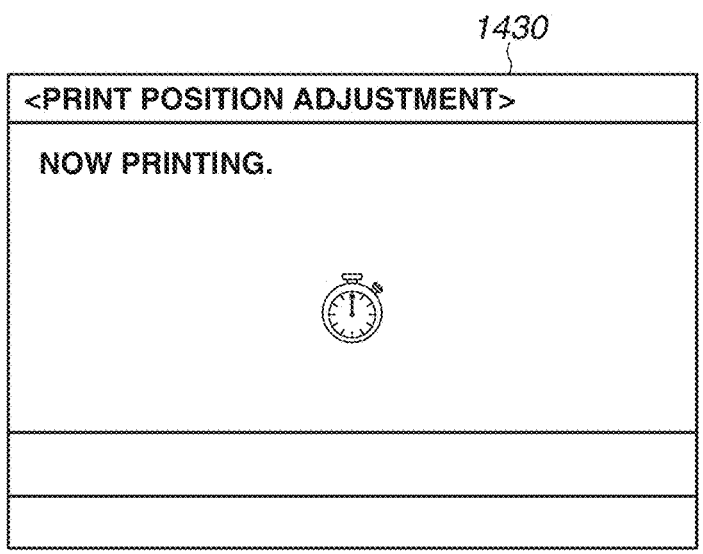

Subsequently, in step S1310, the CPU 114 displays a status screen 1430 illustrated in FIG. 14D on the display panel of the operation unit 120. The status screen 1430 is a screen for notifying the user of that printing is in progress. When an error, such as jam and out of paper occurs during printing, the CPU 114 notifies the user via the status screen 1430 of the occurrence of the error such as jam and out of paper. When the error, such as jam and out of sheet is solved, the CPU 114 notifies the user of that printing is in progress.

In step S1311, the CPU 114 determines whether the output of the test chart 700 is completed. When it is determined that the output of the test chart 700 is completed (YES in step S1311), the CPU 114 advances the processing to step S1312. When it is determined that the output of the test chart 700 is not completed (NO in step S1311), the CPU 114 returns the processing to step S1309. For example, in the case that the number of output sheets designated on the designation screen 1410 is one sheet, one sheet of the test chart 700 is printed, and when a discharge sensor detects that one sheet of the test chart 700 is discharged on the discharge tray 247, the CPU 114 determined as YES. The discharge sensor is disposed on a downstream side of the conveyance rollers 334 and 335. Further, for example, when the number of output sheets designated on the designation screen 1410 is ten sheets, ten sheets of the test chart 700 are printed. When the discharge sensor detects that the ten sheets of the test chart 700 are discharged on the discharge tray 247, the CPU 114 determined as YES.

In step S1312, the CPU 114 initializes a value of a variable N stored in the RAM 113 (N=1). The variable N is a counter for the CPU 114 to identify what number of scanning is currently performed by the one sheet of the test chart 700.

Subsequently, in step S1313, the CPU 114 displays a standby screen for performing N-th scanning on the display panel of the operation unit 120. It is desirable that the standby screen displays information indicating which sheet is currently scanned according to the number of output sheets of the test chart 700 designated on the designation screen 1410. The standby screen displays the information indicating which sheet is currently scanned and information indicating the total number of sheets to be scanned. The standby screen further displays information indicating how many times of scanning is performed on the test chart when scanning is performed four times per test chart 700.

Figure 14E:
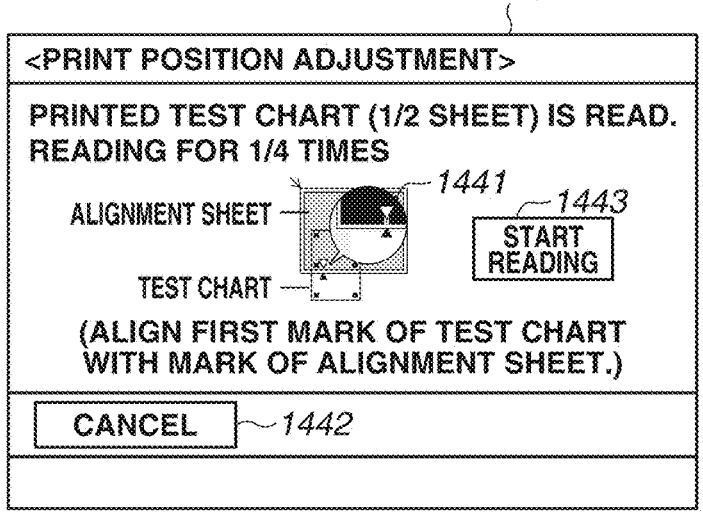
Figure 15G:
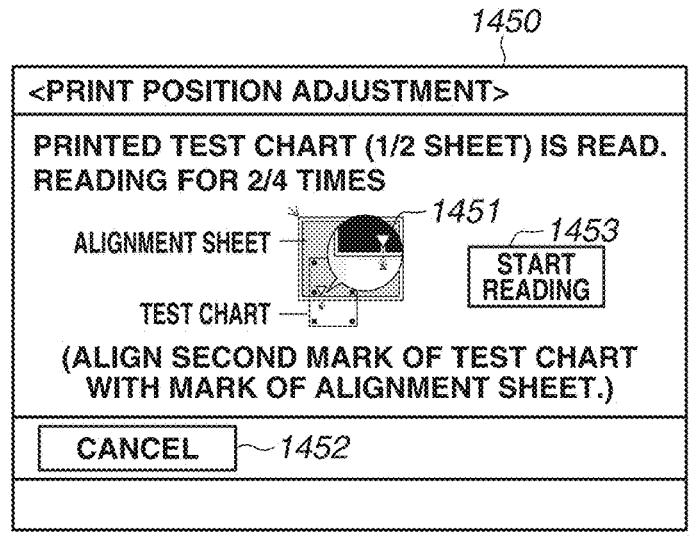
FIGS. 15G to 15L illustrate configurations of screens.
Figure 15H:
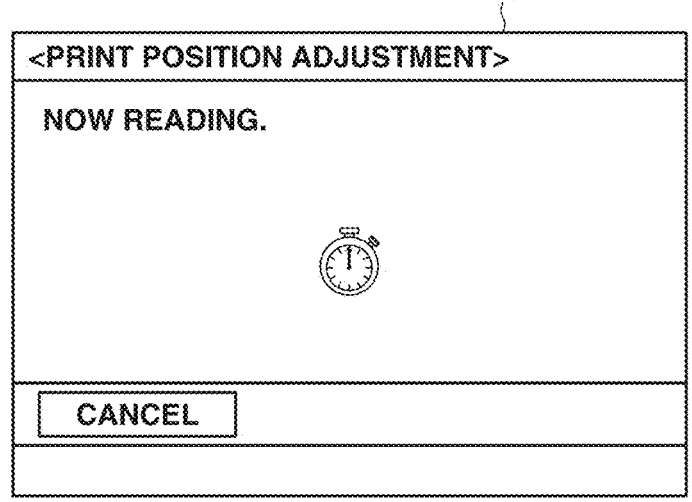
Figure 15I:
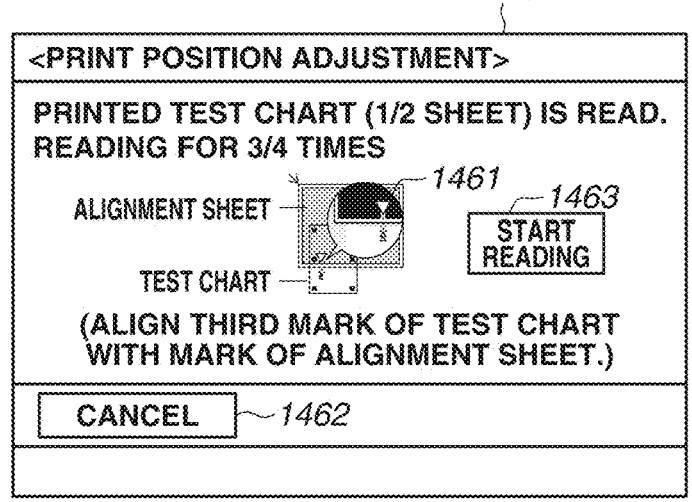
Figure 15J:
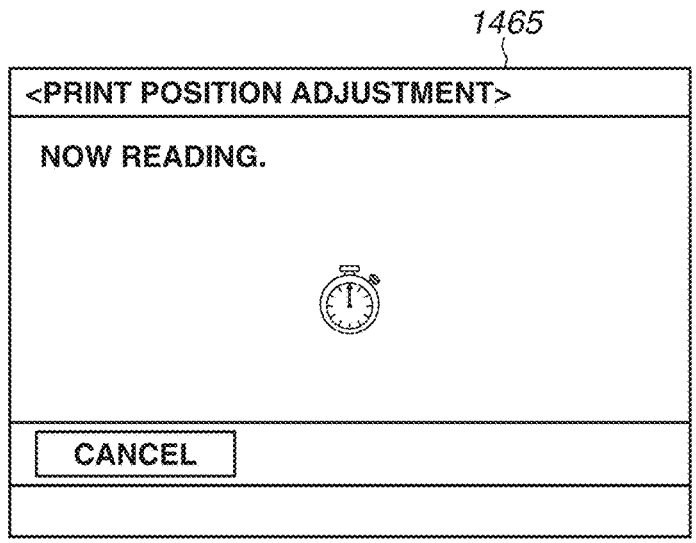
Figure 15K:
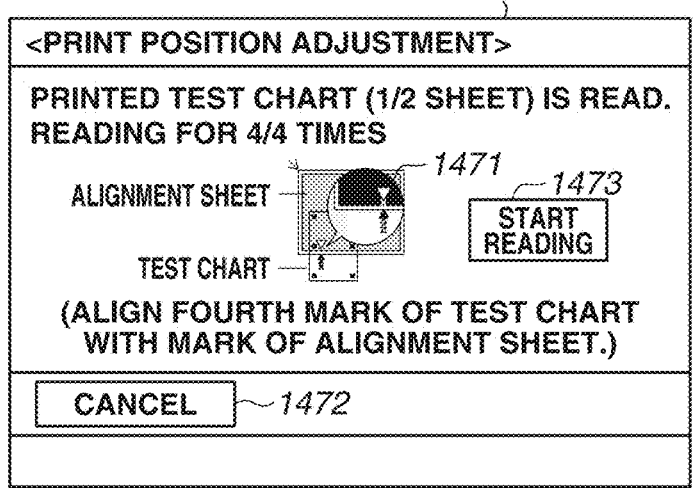

The value of the variable N is initially N=1. Thus, a standby screen 1440 for performing the first scanning is displayed on the display panel of the operation unit 120 as illustrated in FIG. 14E. Whereas, when N=2, a standby screen 1450 for performing the second scanning is displayed on the display panel of the operation unit 120 as illustrated in FIG. 15G. Whereas, when N=3, a standby screen 1460 for performing the third scanning is displayed on the display panel of the operation unit 120 as illustrated in FIG. 15I. Whereas, when N=4, a standby screen 1470 for performing the fourth scanning is displayed on the display panel of the operation unit 120 as illustrated in FIG. 15K.

The standby screen 1440 displays an image 1441 indicating how to place the alignment sheet 1000 and the test chart 700 on the document positioning glass plate 202 for performing the first scanning. In the image 1441, the positional relationship between the alignment sheet 1000 and the test chart 700, the alignment marker 1011 of the alignment sheet 1000, and the alignment marker 710 of the test chart 700 are enlarged and displayed for performing the first scanning. Similarly, the standby screen 1450 displays an image 1451 indicating how to place the alignment sheet 1000 and the test chart 700 on the document positioning glass plate 202 for performing the second scanning. In the image 1451, the positional relationship between the alignment sheet 1000 and the test chart 700, the alignment marker 1011 of the alignment sheet 1000, and the alignment marker 710 of the test chart 700 are enlarged and displayed for performing the second scanning. Similarly, the standby screen 1460 displays an image 1461 indicating how to place the alignment sheet 1000 and the test chart 700 on the document positioning glass plate 202 for performing the third scanning. In the image 1461, the positional relationship between the alignment sheet 1000 and the test chart 700, the alignment marker 1011 of the alignment sheet 1000, and the alignment marker 710 of the test chart 700 are enlarged and displayed for performing the third scanning. Similarly, the standby screen 1470 displays an image 1471 indicating how to place the alignment sheet 1000 and the test chart 700 on the document positioning glass plate 202 for performing the fourth scanning. In the image 1471, the positional relationship between the alignment sheet 1000 and the test chart 700, the alignment marker 1011 of the alignment sheet 1000, and the alignment marker 710 of the test chart 700 are enlarged and displayed for performing the fourth scanning.

As described above, the CPU 114 controls screen display so that a schematic diagram in the standby screen for performing N-th scanning is changed in response to the value of the variable N. Accordingly, the user can understand how to place the alignment sheet 1000 and the test chart 700 on the document positioning glass plate 202 by referring to the number of markers including the alignment marker 710 printed on the test chart 700. Further, the user can understand which area of the test chart 700 the scanner unit 130 should read by referring to the number of markers including the alignment marker 710 printed on the test chart 700.

In step S1314, the CPU 114 determines whether a cancel button 1442 (1452, 1462, or 1472) is pressed via the standby screen 1440 (1450, 1460, or 1470). When it is determined as YES in step S1314, the CPU 114 returns the processing to step S1301. Whereas, when it is determined as NO in step S1314, the CPU 114 advances the processing to step S1315.

In step S1315, the CPU 114 determines whether a reading start button 1443 (1453, 1463, or 1473) is pressed via the standby screen 1440 (1450, 1460, or 1470). When it is determined as YES in step S1315, the CPU 114 advances the processing to step S1316. Whereas, when it is determined as NO in step S1315, the CPU 114 returns the processing to step S1314.

In step S1316, the CPU 114 instructs the scanner unit 130 to scan the test chart 700 placed on the document positioning glass plate 202. The scanner unit 130 reads the image of the test chart 700 and generates the image data.

Figure 14F:
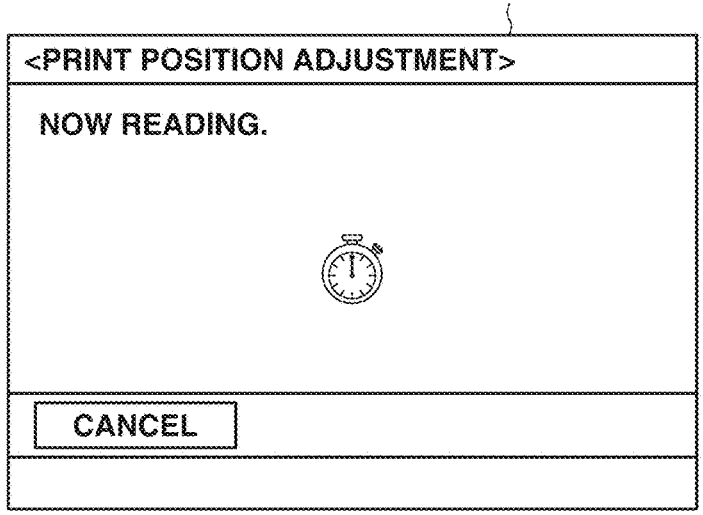
Figure 15L:
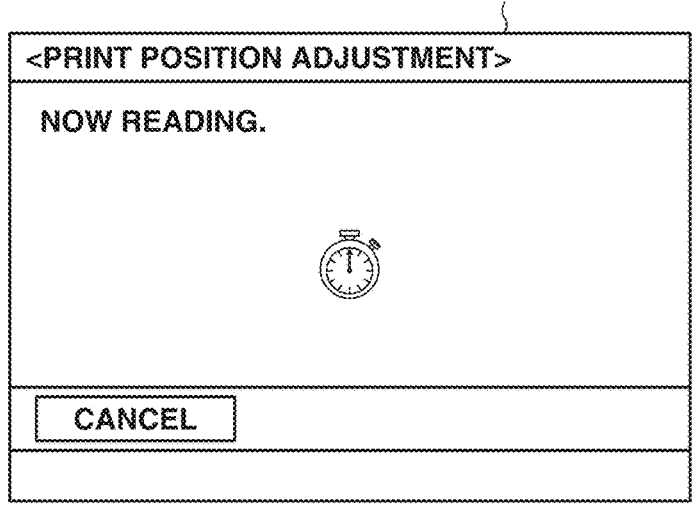

Subsequently, in step S1317, the CPU 114 displays a status screen for notifying the user of that scanning is in progress on the display panel of the operation unit 120. When N=1, a status screen 1445 illustrated in FIG. 14F is displayed on the display panel of the operation unit 120. The status screen 1445 is a screen for notifying the user of that the first scanning of the test chart 700 is currently performed. Whereas, when N=2, a status screen 1455 illustrated in FIG. 15H is displayed on the display panel of the operation unit 120. The status screen 1455 is a screen for notifying the user of that the second scanning of the test chart 700 is currently performed. Whereas, when N=3, a status screen 1465 illustrated in FIG. 15J is displayed on the display panel of the operation unit 120. The status screen 1465 is a screen for notifying the user of that the third scanning of the test chart 700 is currently performed. Whereas, when N=4, a status screen 1475 illustrated in FIG. 15L is displayed on the display panel of the operation unit 120. The status screen 1475 is a screen for notifying the user of that the fourth scanning of the test chart 700 is currently performed.

In step S1318, the CPU 114 determines whether the scanning of the test chart 700 is completed. When it is determined that the scanning of the test chart 700 is completed (YES in step S1318), the CPU 114 advances the processing to step S1319. Whereas, when it is determined that the scanning of the test chart 700 is not completed (NO in step S1318), the CPU 114 returns the processing to step S1316.

In step S1319, the CPU 114 analyzes the image data 1200 generated by reading the image of the test chart 700 by the scanner unit 130. The analysis processing of the image data 1200 is executed by the method described above with reference to FIGS. 12A and 12B (for example, the method for measuring the density changes in the main scanning direction and in the sub scanning direction from the edge of the image data 1200 by pixel unit).

In step S1320, the CPU 114 detects the edge of the test chart 700, the edge of the correction marker 720, and each of the area markers (741 to 744) based on the analysis result of the image data in step S1319.

Subsequently, in step S1321, the CPU 114 obtains position information of the correction marker 720 based on the edge of the test chart 700 and the edge of the correction marker 720 which are detected in step S1320. The position information of the correction marker 720 is referred by the CPU 114 when calculating the lengths (A) to (V) illustrated in FIGS. 8A and 8B in step S1326 described below. The position information of the correction marker 720 obtained in step S1321 is stored in the RAM 113.

Subsequently, in step S1322, the CPU 114 determines whether an N-th corresponding area marker (741 to 744) is detected based on a detection result in step S1320. For example, when the value of the variable N is one, the CPU 114 determines whether a first corresponding area marker is detected. Further, when the value of the variable N is two, the CPU 114 determines whether a second corresponding area marker is detected. Further, when the value of the variable N is three, the CPU 114 determines whether a third corresponding area marker is detected. Further, when the value of the variable N is four, the CPU 114 determines whether a fourth corresponding area marker is detected. In this regard, the CPU 114 determines whether the detected area marker corresponds to which one based on, for example, the color of the alignment marker 710 included in the area marker. The CPU 114 determines the color of the alignment marker 710 based on the RGB data input from the CCD sensor 221. For example, when the detected color is green, the CPU 114 determines as the first corresponding the area marker. When the detected color is red, the CPU 114 determines as the second corresponding the area marker. When the detected color is blue, the CPU 114 determines as the third corresponding the area marker. When the detected color is yellow, the CPU 114 determines as the fourth corresponding the area marker. In this regard, a correspondence relationship between the type of the color of the alignment marker 710 and which corresponding area marker is not limited to the above-described example. A modification may be adopted in which the CPU 114 determines which one the detected area marker corresponds to based on the number of the markers included in the respective area markers 741 to 744.

When it is determined as YES in step S1322, the CPU 114 advances the processing to step S1323. Whereas, when it is determined as NO in step S1322, the CPU 114 advances the processing to step S1329. For example, it is assumed that when the value of the variable N is one, the first corresponding the area marker is not detected, but the second corresponding the area marker is detected. In this case, the alignment sheet 1000 and the test chart 700 are not correctly placed on the document positioning glass plate 202, and the test chart 700 is not scanned in the correct order, so that the CPU 114 determines as NO in step S1322. Further, for example, it is assumed that when the value of the variable N is two, any one of the area marker 741, the area marker 742, the area marker 743, and the area marker 744 is not detected. In this case, the alignment marker 1011 of the alignment sheet 1000 does not correctly match with the alignment marker 710 of the test chart 700, and thus the test chart 700 is not correctly scanned. Accordingly, the CPU 114 determines as NO in step S1322.

Figure 16:
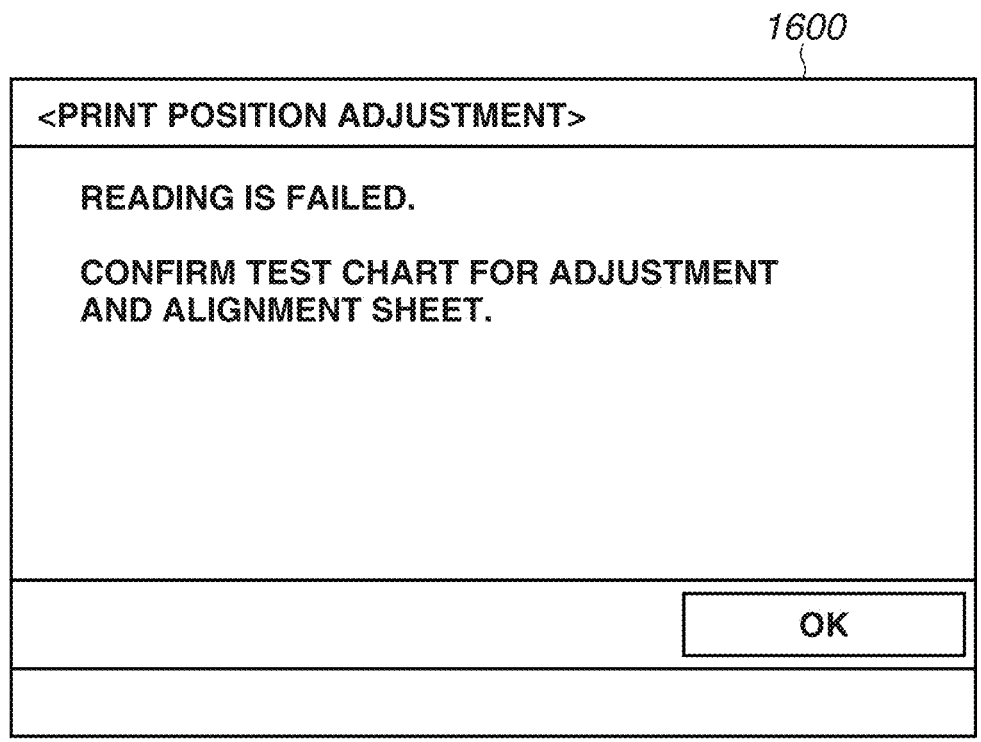
FIG. 16 illustrates a configuration of a screen.

When it is determined that the N-th corresponding area marker is not detected (NO in step S1322), the CPU 114 advances the processing to step S1329. In step S1329, the CPU 114 displays an error screen 1600 illustrated in FIG. 16 on the display panel of the operation unit 120. The error screen 1600 is a screen for notifying the user of failure in the scanning of the test chart 700. The error screen 1600 is also a screen for prompting the user to confirm whether the alignment sheet 1000 and the test chart 700 is correctly placed on the document positioning glass plate 202. The user can correctly reset the alignment sheet 1000 and the test chart 700 on the document positioning glass plate 202 by looking at the error screen 1600. After the processing in step S1329, the CPU 114 returns the processing to step S1313.

Whereas, when it is determined that the N-th corresponding area marker is detected (YES in step S1322), the CPU 114 advances the processing to step S1323. In step S1323, the CPU 114 counts up the value of the variable N by one (N=N+1). Subsequently, in step S1324, the CPU 114 determines whether the value of the variable N is larger than four. When it is determined that the value of the variable N is larger than four (YES in step S1324), the CPU 114 advances the processing to step S1325. Whereas, when it is determined that the value of the variable N is less than or equal to four (NO in step S1324), the CPU 114 returns the processing to step S1313.

In step S1325, the CPU 114 determines whether the scanning of the test chart 700 is completed for the number of output sheets designated by the designation screen 1410. When it is determined that the scanning of the test chart 700 is completed for the number of output sheets designated by the designation screen 1410 (YES in step S1325), the CPU 114 advances the processing to step S1326. Whereas, when it is determined as NO in step S1325, the CPU 114 returns the processing to step S1312. For example, when the number of output sheets designated by the designation screen 1410 is ten sheets, a series of the processing from step S1312 to step S1325 is repeated ten times. When the number of output sheets designated by the designation screen 1410 is ten sheets, the scanning is performed four times from the first to the fourth per test chart 700, so that the scanning is performed 40 times in total.

In step S1326, the CPU 114 calculates the lengths (A) to (V) illustrated in FIGS. 8A and 8B based on the position information of the correction marker 720 obtained in step S1321. When a plurality of the sheets of the test chart 700 is scanned, the CPU 114 obtains the position information pieces of the plurality of the correction markers 720 and calculates an average value of the position information pieces of the plurality of the correction markers 720. The CPU 114 calculates the lengths (A) to (V) illustrated in FIGS. 8A and 8B based on the calculated average value of the position information pieces of the correction markers 720.

Subsequently, in step S1327, the CPU 114 calculates the geometrical correction amounts based on the lengths (A) to (V) calculated in step S1326. The geometrical correction amounts are the lead position, the side position, the main-scanning magnification, the sub-scanning magnification, the right angle correction amount, and the trapezoid angle correction amount described above with reference to FIG. 9.

Subsequently, in step S1328, the CPU 114 registers the geometrical correction amounts calculated in step S1327 in the sheet management table 500 as the geometrical correction amounts to the sheet selected on the selection screen 1420. For example, the lead position, the side position, the main-scanning magnification, the sub-scanning magnification, the right angle correction amount, and the trapezoid angle correction amount are registered in the sheet management table 500 as information pieces indicating the geometrical correction amounts of the front surface of the sheet selected on the selection screen 1420. At that time, these geometrical correction amounts are set in association with the front surface of the sheet selected on the selection screen

1420. Then, the CPU 114 controls the printer engine 150 to adjust the position at which the image is printed on the front surface of the sheet based on the geometrical correction amounts set in association with the front surface of the sheet.

Further, for example, in step S1328, the lead position, the side position, the main-scanning magnification, the sub-scanning magnification, the right angle correction amount, and the trapezoid angle correction amount are registered in the sheet management table 500 as the geometrical correction amounts of the rear surface of the sheet selected on the selection screen 1420 and information pieces indicating the geometrical correction amounts of the rear surface. At that time, these geometrical correction amounts are set in association with the rear surface of the sheet selected on the selection screen 1420. Then, the CPU 114 controls the printer engine 150 to adjust the position at which the image is printed on the rear surface of the sheet based on the geometrical correction amounts set in association with the rear surface of the sheet. After the processing in step S1328, the CPU 114 terminates a series of the processing regarding the flowchart in FIG. 13.

Next, the print position adjustment method not using the scanner unit 130 is described in steps S1339 to S1337.

In steps S1339 to S1334, the CPU 114 performs the processing same as that described above in steps S1306 to S1311. After the processing in step S1334, the CPU 114 advances the processing to step S1335.

In step S1335, the CPU 114 receives inputs of the actual measured values of the lengths (A) to (V) illustrated in FIGS. 8A and 8B from the user via an input screen which is displayed when an input instruction button is pressed. For example, the user puts a ruler on the test chart 700 and measures a distance from the edge of the test chart 700 to the edge of the correction marker 720 to obtain the length (C) in FIG. 8A.

Subsequently, in step S1336, the CPU 114 calculates the geometrical correction amounts based on the lengths (A) to (V) in FIGS. 8A and 8B of which inputs are received in step S1335.

Subsequently, in step S1337, the CPU 114 registers the geometrical correction amounts calculated in step S1336 in the sheet management table 500 as the geometrical correction amounts to the sheet selected on the selection screen 1420. These geometrical correction amounts are set in association with the front surface (or the rear surface) of the sheet selected on the selection screen 1420. The CPU 114 controls the printer engine 150 to adjust the position at which the image is printed on the front surface (or the rear surface) of the sheet based on the geometrical correction amounts set in association with the front surface (or the rear surface) of the sheet.

As described above, the image forming apparatus prints the plurality of the first images indicating the print positions and the second image indicating the reading order of the plurality of the first images on a sheet. The image forming apparatus then obtains the print positions of the plurality of the first images printed on the sheet based on image data generated by reading the plurality of the first images in the reading order indicated by the second image. Subsequently, the image forming apparatus adjusts the position at which the image is printed on the sheet based on the obtained print positions of the plurality of the first images. In other words, the user can understand how to place the sheet by looking at the sheet on which the plurality of images indicating the print positions is printed in order to adjust the position at which the image is printed on the sheet.

For example, the image forming apparatus prints, on the test chart 700, the number of markers (the area markers 741 to 744) corresponding to an order of placing the test chart 700 on the document positioning glass plate 202 so as to indicate the order of placing the test chart 700 on the document positioning glass plate 202 to the user. Further, for example, the image forming apparatus determines whether the N-th corresponding area marker is detected and gives a warning to the user when the N-th corresponding area marker is not detected.

As described above, an order of scanning and an area to be scanned in the test chart 700 are associated with each other, and thus the CPU 114 identifies which area of the test chart 700 an image is read to obtain the image data generated by scanning. Therefore, the user is required to perform scanning in the order of scanning to enable the CPU 114 to correctly identify which area of the test chart 700 the image is read to obtain the image data generated by scanning. Thus, the user may correctly reset the alignment sheet 1000 and the test chart 700 on the document positioning glass plate 202 by looking at the screen displaying the warning. Accordingly, the respective print positions of the edge of the test chart 700 and the plurality of the correction markers 720 can be correctly detected from the image data generated by reading the image of the test chart 700.

The case is described above in which the image data pieces generated by scanning twice, namely the upper portion and the lower portion of the front surface (or the rear surface) of the test chart 700 are composed to calculate a distance from the edge of the test chart 700 to the correction marker 720, however, the present exemplary embodiment is not limited to this case. For example, the composition processing may be omitted by respectively calculating a difference in distances of the correction markers 720 on the upper portion of the front surface of the test chart 700 and the composition marker 730 and a difference in distances of the correction markers 720 on the lower portion of the front surface and the composition marker 730 and calculating an average value of the differences. Similarly, the composition processing may be omitted by respectively calculating a difference in distances of the correction markers 720 on the upper portion of the rear surface of the test chart 700 and the composition marker 730 and a difference in distances of the correction markers 720 on the lower portion of the rear surface and the composition marker 730 and calculating an average value of the differences.

In the above description, the example is described in which it is determined whether the N-th corresponding area marker is detected in the series of processing for adjusting the print position, and a warning is given to a user when the N-th corresponding area marker is not detected (in steps S1322 and S1329). On the other hand, a modification is described below in which it is determined whether the area marker already scanned is detected regardless of a detected order of the area markers, and when the already scanned area marker is detected, a warning is given to the user. According to the modification, a part of the processing is different compared to the above description, so that the processing different from the above description is mainly described with reference to FIG. 17 (including FIGS. 17A and 17B).

In step S1701, the CPU 114 determines whether the already scanned area marker (741 to 744) is detected. The CPU 114 determines whether the already scanned area marker is detected or not based on information of the area marker temporarily stored in the RAM 113.

In step S1701, when it is determined that the already scanned area marker is not detected (NO in step S1701), the CPU 114 advances the processing to step S1702. In step S1702, the CPU 114 temporarily stores the information of the area marker detected in step S1320 in the RAM 113. After the processing in step S1702, the CPU 114 advances the processing to steps S1323 and S1324, and then in step S1703, the CPU 114 determines whether all of the area markers are detected. The CPU 114 determines whether all of the area markers are detected or not based on the information pieces of the area markers temporarily stored in the RAM 113. For example, the CPU 114 determines as YES in step S1703 when green, red, blue, and yellow are already detected each as the color of the alignment marker included in the area marker. At that time, this means that the upper portion and the lower portion of the front surface of the test chart 700 and the upper portion and the lower portion of the rear surface of the test chart 700 are respectively scanned by the scanner unit 130. As described above, according to the modification in which the type of the color of the alignment marker 710 is not associated with the information indicating which one the area marker corresponds to, a user can perform scanning in no particular order without being conscious of a scanning order. When it is determined that all of the area markers are detected (YES in step S1703), the CPU 114 advances the processing to step S1704. Whereas, when it is determined that the area markers are not all detected (NO in step S1703), the CPU 114 returns the processing to step S1313.

In step S1704, the CPU 114 deletes the information of the area marker temporarily stored in the RAM 113. After the processing in step S1704, the CPU 114 advances the processing to step S1325.

On the other hand, in step S1701, when it is determined that the already scanned area marker is detected (YES in step S1701), the CPU 114 advances the processing to step S1705. For example, in the case that the CPU 114 has already detected green as the color of the alignment marker 710 included in the area marker and detects green again in the present scanning in a state in which information of the detected area marker is temporarily stored in the RAM 113, the CPU 114 determines as YES in step S1701.

In step S1705, the CPU 114 obtains information of the area marker not yet scanned. The CPU 114 determines the information of the area marker not yet scanned based on the information of the area marker temporarily stored in the RAM 113.

Figure 18:
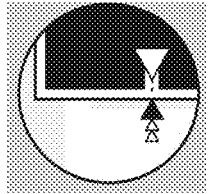
FIG. 18 illustrates a configuration of a screen according to the modification.

Subsequently, In step S1706, the CPU 114 displays an error screen 1800 illustrated in FIG. 18 on the display panel of the operation unit 120. The error screen 1800 is a screen for notifying the user of failure of the scanning of the test chart 700. The error screen 1800 is also a screen for prompting the user how to reset the alignment sheet 1000 and the test chart 700 on the document positioning glass plate 202. The CPU 114 determines how to reset the alignment sheet 1000 and the test chart 700 on the document positioning glass plate 202 based on the information of the area marker not yet scanned obtained in step S1705. After the processing in step S1706, the CPU 114 returns the processing to step S1313.

As described above, according to the modification, it is determined whether the already scanned area marker is detected regardless of the detected order of the area markers, and when the already scanned area marker is detected, a warning is given to the user. The user may confirm how to reset the alignment sheet 1000 and the test chart 700 on the document positioning glass plate 202 by looking at the screen displaying the warning and reset the alignment sheet 1000 and the test chart 700 on the document positioning glass plate 202. Accordingly, the user does not have to be conscious of the order of placing the test chart 700 on the document positioning glass plate 202 for correctly detecting the respective print positions of the edge of the test chart 700 and the plurality of the correction markers 720.

The present invention is not limited to the above-described exemplary embodiments and can be modified in various ways without departing from the gist of the present invention. In this respect, the present invention does not intend to exclude other embodiments that are not discussed in this description.

For example, the CPU 114 in the controller unit 110 of the image forming apparatus 100 is mainly perform the above-described various types of control, however, the present invention is not limited to this configuration. A print control apparatus, such as an external controller installed in a different housing from the image forming apparatus 100 may be configured to perform a part or the whole of the above-described various types of control.

Further, the image forming apparatus 100 is described as the configuration including the image forming unit 151 handling a plurality of color toners, however, the image forming apparatus 100 is not limited to this configuration. The image forming apparatus may be, for example, a monochromatic image forming apparatus including the image forming unit 151 handling a single color toner.

The present invention can also be realized by executing the following processing. More specifically, a program for realizing one or more functions of the above described exemplary embodiments is supplied to a system or an apparatus via a network or storage media, and one or more processors in a computer of the system or the apparatus reads and executes the program. The present invention can also be realized by circuits (e.g., application specific integrated circuit (ASIC)) for realizing one or more functions of the above described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-003729, filed Jan. 12, 2016, which is hereby incorporated by reference herein in its entirety.

What is claimed is:

1. An image forming apparatus comprising:
a printer configured to print an image on a sheet;
a scanner having a glass plate on which a test chart is to be placed and configured to scan the test chart placed on the glass plate and output a read image regarding the test chart;
a controller configured to:
    print the test chart using the printer, the test chart including a detection image printed on a detection surface of the sheet, a first mark printed on the detection surface, and a second mark printed on the detection surface, wherein the detection image is used for detecting a deviation of a print position and wherein a print position of the first mark on the sheet is different from a print position of the second mark on the sheet;
    perform a first scan by the scanner to acquire a first read image relating to a first region including a portion of the detection image and the first mark;
    perform a second scan by the scanner to acquire a second read image relating to a second region including another portion of the detection image and the second mark, the second region being different from the first region; and control the print positions based on the detected deviation of the print positions; and a display configured to:
display a screen for notifying a user of a position at which the test chart is to be placed on the glass plate in the first scan;
display a screen for notifying the user of a position at which the test chart is to be placed on the glass plate in the second scan;
display a screen for prompting the user to reset the test chart in a case where the first mark is not detected from the first read data; and
display a screen for prompting the user to reset the test chart in a case where the second mark is not detected from the second read data,
wherein the controller causes the printer to print a third mark and a fourth mark on a surface of the sheet different from the detection surface, a print position of the third mark being different from a print position of the fourth mark,
wherein a color of the first mark is different from a color of the second mark,
wherein the color of the first mark is different from a color of the third mark,
wherein the color of the first mark is different from a color of the fourth mark,
wherein the color of the second mark is different from the color of the third mark,
wherein the color of the second mark is different from the color of the fourth mark, and
wherein the color of the third mark is different from the color of the fourth mark.

2. The image forming apparatus according to claim 1, wherein a color of the first mark is different from a color of the second mark.

3. The image forming apparatus according to claim 1, wherein the first mark and the second mark indicate an order for scanning the test chart.

4. The image forming apparatus according to claim 1, wherein the display, in a case where the first mark is not detected from the first read image, displays the screen for notifying the user of the position at which the test chart is to be placed on the glass plate in the first scan, again, after the screen for prompting the user to reset the test chart is displayed.

5. The image forming apparatus according to claim 1, wherein the display does not display the screen for notifying the user of the position at which the test chart is to be placed on the glass plate in the second scan until the first mark is detected from the first read image.

6. The image forming apparatus according to claim 1, wherein the controller generates an adjustment condition of the print position based on the detected deviation of the print position and controls the print position based on the adjustment condition,
wherein the controller does not generate the adjustment condition in a case where the first mark is not detected from the first read image, and
wherein the controller does not generate the adjustment condition in a case where the second mark is not detected from the second read image.

7. The image forming apparatus according to claim 1,
wherein the display further displays a screen for notifying the user of failure of the first scan in a case where the first mark is not detected from the first read image, and
wherein the display further displays a screen for notifying the user of failure of the second scan in a case where the second mark is not detected from the second read image.

8. The image forming apparatus according to claim 1, wherein the controller selects one sheet, on which the detection image is to be formed, from among a plurality of sheets, and causes the printer to print the detection image, the first mark, and the second mark on the selected sheet.

9. The image forming apparatus according to claim 1, wherein the controller generates an adjustment condition corresponding to a type of the sheet based on the deviation of the print position and controls the print position based on the adjustment condition.

10. The image forming apparatus according to claim 1,
wherein the controller further performs a third scan by the scanner to acquire a third read image relating to a third region of the detection image,
wherein the controller further performs a fourth scan by the scanner to acquire a fourth read image relating to a fourth region of the detection image, the fourth region being different from the third region, and
wherein a deviation of the print position of the different surface is adjusted based on the acquired third image and the acquired fourth image.

11. The image forming apparatus according to claim 10,
wherein the display further displays a screen for notifying a user of a position at which the test chart is to be placed on the glass plate in the third scan,
wherein the display further displays a screen for notifying the user of a position at which the test chart is to be placed on the glass plate in the fourth scan,
wherein the display further displays a screen for prompting the user to reset the test chart in a case where the third mark is not detected from the third read data, and
wherein the display further displays a screen for prompting the user to reset the test chart in a case where the fourth mark is not detected from the fourth read data.

12. The image forming apparatus according to claim 10, wherein the display further displays a screen for notifying the user of how the test chart for the fourth scan is to be placed in a case where a mark other than the fourth mark is detected from the fourth read image.

13. The image forming apparatus according to claim 1, wherein the display further displays a screen for notifying the user of how the test chart for the second scan is to be placed in a case where the first mark is detected from the second read image.

14. An image forming apparatus having a reader that reads an original, wherein the image forming apparatus copies the original read by the reader, the image forming apparatus comprising:
a printer configured to print an image on a sheet;
a display; and
a controller configured to:
control the printer to print a detection image, a first mark, and a second mark on the sheet, wherein the detection image is used for detecting geometric characteristics of an image to be printed on the sheet, wherein the second mark is different from the first mark, wherein the first mark is printed on a surface of the sheet on which the detection image is printed, and wherein the second mark is printed on the surface of the sheet on which the first mark is printed;

control the display to display a first screen that prompts for execution of a first read operation for reading a portion of the detection image and the first mark by using the reader;

acquire first read data outputted by the reader after the first screen is displayed on the display;

control the display to display a second screen that prompts execution of a second read operation for reading another portion of the detection image and the second mark by using the reader after the first read data is acquired;

acquire second read data outputted by the reader after the second screen is displayed on the display;

detect the geometric characteristics based on the first read data and the second read data; and control the detected geometric characteristics, wherein, in a case where the first read data is different from read data related to the portion of the detection image and the first mark, the controller controls the display to display a third screen that prompts for a retry of the first read operation before displaying the second screen, wherein, in a case where the second read data is different from read data related to the another portion of the detection image and the second mark, the controller controls the display to display a fourth screen that prompts a retry of the second read operation.

15. The image forming apparatus according to claim 14, wherein a color of the first mark is different from a color of the second mark.

16. The image forming apparatus according to claim 14, wherein a color of the first mark is a first chromatic color, and wherein the color of the second mark is a second chromatic color different from the first chromatic color.

17. The image forming apparatus according to claim 14, wherein the controller controls the display to display the fourth screen before the geometric characteristics are detected.

18. The image forming apparatus according to claim 14, wherein a print position of the first mark in a long distance direction of the sheet is different from a print position of the second mark in the long distance direction of the sheet.

* * * * *